United States Patent
Chou et al.

(10) Patent No.: US 10,068,548 B1
(45) Date of Patent: Sep. 4, 2018

(54) SUB-PIXEL LAYOUT RESAMPLER SYSTEMS AND METHODS

(71) Applicant: Apple Inc., Cupertino, CA (US)

(72) Inventors: Jim Chou, San Jose, CA (US); Koorosh Aflatooni, Cupertino, CA (US); Marc Albrecht, San Francisco, CA (US); Myung-Je Cho, San Jose, CA (US); Hyunwoo Nho, Stanford, CA (US); Christopher P. Tann, San Jose, CA (US); Mahesh B. Chappalli, San Jose, CA (US); Guy Côté, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/614,294

(22) Filed: Jun. 5, 2017

Related U.S. Application Data

(60) Provisional application No. 62/346,517, filed on Jun. 6, 2016.

(51) Int. Cl.
  *G09G 5/02* (2006.01)
  *G06T 5/00* (2006.01)
  (Continued)

(52) U.S. Cl.
  CPC ............. *G09G 5/026* (2013.01); *G09G 3/007* (2013.01); *G09G 3/2003* (2013.01); *H04N 1/58* (2013.01); *H04N 1/6088* (2013.01); *H04N 9/68* (2013.01)

(58) Field of Classification Search
  CPC ...... G09G 5/026; G09G 3/2003; G09G 3/007; H04N 1/58; H04N 1/6088; H04N 9/68
  See application file for complete search history.

(56) References Cited

U.S. PATENT DOCUMENTS

2005/0225563 A1* 10/2005 Brown Elliott .......... G09G 5/02
  345/604
2010/0045695 A1* 2/2010 Brown Elliott ...... G09G 3/2003
  345/589

(Continued)

OTHER PUBLICATIONS

Messing et al, "Subpixel rendering on nonstriped colour matrix displays", Image Processing, 2003. ICIP 2003. Proceedings. 2003 International Conference on Image Processing (Cat. No. 03CH37429) vol. 3 Sep. 14-17, 2003.*

*Primary Examiner* — Tapas Mazumder
(74) *Attorney, Agent, or Firm* — Fletcher Yoder PC

(57) ABSTRACT

Systems and methods for improving perceived image quality of an electronic display, which includes a co-located sub-pixel that controls luminance of a first color component and an offset sub-pixel that controls luminance of a second color component. A display pipeline communicatively coupled to the electronic display determines image data, which indicates target luminance of the first, the second, and a third color component at an image pixel; determines edge parameters, which indicate whether an edge is expected to be present at the offset sub-pixel, based on a difference metric between a first image pixel block around the offset sub-pixel and a second image pixel block offset from the first image pixel block; and determines offset sub-pixel image data by filtering an image pixel group around the offset sub-pixel based at least in part on the edge parameters, wherein the offset sub-pixel image data indicates target luminance of the offset sub-pixel.

20 Claims, 14 Drawing Sheets

(51) Int. Cl.
   *H04N 9/68* (2006.01)
   *H04N 1/58* (2006.01)
   *G09G 3/20* (2006.01)
   *G09G 3/00* (2006.01)
   *H04N 1/60* (2006.01)

(56) References Cited

U.S. PATENT DOCUMENTS

2016/0277722 A1* 9/2016 Guo .................... H04N 13/0422
2017/0162103 A1* 6/2017 An ........................ G09G 3/3208

* cited by examiner

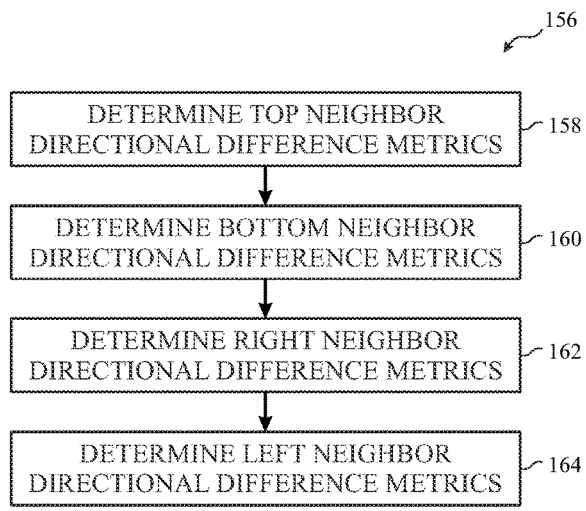
FIG. 13
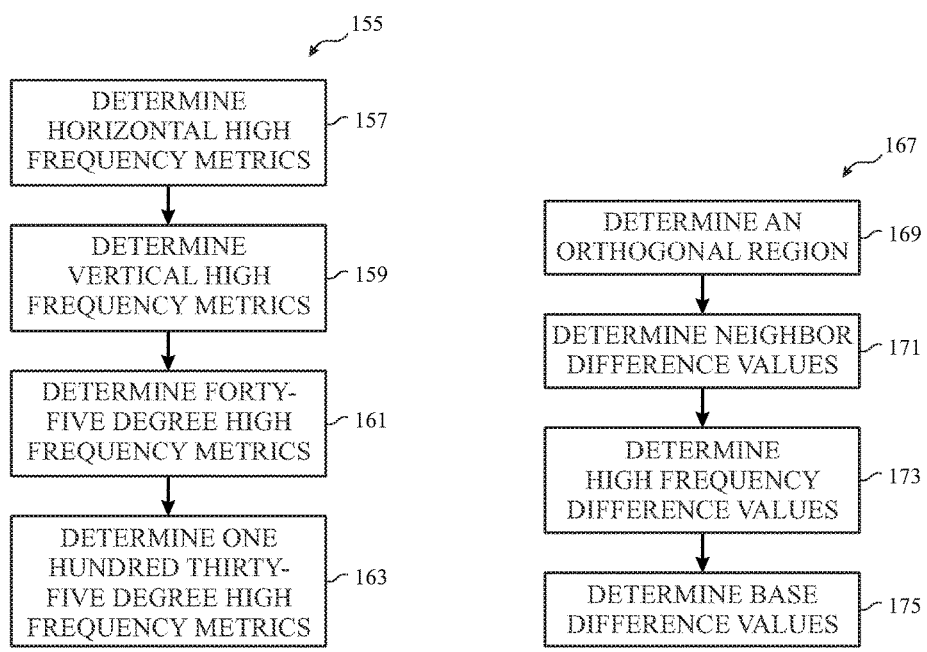
FIG. 14
FIG. 15

SUB-PIXEL LAYOUT RESAMPLER SYSTEMS AND METHODS

CROSS-REFERENCE TO RELATED APPLICATIONS

This application is a Non-Provisional Application claiming priority to U.S. Provisional Patent Application No. 62/346,517, entitled "SUB-PIXEL LAYOUT RESAMPLER SYSTEMS AND METHODS," filed Jun. 6, 2016, which is herein incorporated by reference.

BACKGROUND

The present disclosure relates generally to electronic displays and, more particularly, to sub-pixel layout resampling in electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use electronic displays to provide visual representations of information by displaying one or more images. Such electronic devices may include computers, mobile phones, portable media devices, tablets, televisions, virtual-reality headsets, and vehicle dashboards, among many others. To display an image, an electronic display may control light emission from display pixels based at least in part on image data, which indicates target characteristics of the image. For example, image data may indicate target luminance of specific color components, such as a green component, a blue component, and/or a red component, at various points (e.g., image pixels) in the image.

Relying on blending (e.g., averaging) of the color components, the electronic display may enable perception of various colors in the image. For example, blending the green component, the blue component, and the red components at various luminance levels may enable perception of a range of colors from black to white. To facilitate controlling luminance of the color components, each display pixel in the electronic display may include one or more sub-pixels, which each controls luminance of one color component. For example, a display pixel may include a red sub-pixel, a blue sub-pixel, and/or a green sub-pixel.

In some cases, layout of sub-pixels in electronic displays may vary. More specifically, in some instances, display pixels in different of electronic displays may include different number of sub-pixels and/or different color component sub-pixels. For example, a display pixel in one electronic display may include a red sub-pixel, a blue sub-pixel, and a green sub-pixel, whereas a display pixel in another electronic display may include a red sub-pixel and a green sub-pixel. Additionally, in some instances, location of sub-pixels in different electronic display may vary. For example, the sub-pixels in the first display pixel may be relatively co-located, whereas one of the sub-pixels in the second display pixel may be offset from the other sub-pixel. Nevertheless, to facilitate operational flexibility, an image data source may output the image data in relatively the same format, for example, with little or no consideration of sub-pixel layout in the electronic display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving perceived image quality of an image displayed on an electronic display. In some embodiments, the electronic display may display the image based at least in part on image data output from an image data source. For example, the image data source may output image data in a red-green-blue (RGB) format, which indicates target luminance of a red component, a green component, and a blue component at each image pixel in the image.

Thus, to facilitate displaying the image, the electronic display may include multiple sub-pixels, which each controls luminance of one color component. However, even when utilizing similar color component sub-pixels, different electronic displays may implement different sub-pixel layouts. For example, a first electronic display may implement a first sub-pixel layout, in which each display pixel includes a co-located red sub-pixel, green sub-pixel, and blue sub-pixel. On the other hand, a second electronic display may be implemented using a second sub-pixel layout, in which each display pixel includes a co-located green sub-pixel, some (e.g., approximately half) display pixels include an offset red sub-pixel, and other (e.g., approximately half) display pixels include an offset blue sub-pixel.

In some instances, an image data source may output image data in any one of multiple source formats. Thus, to improve operational flexibility, an electronic display may be capable of displaying an image based on image data in any one of the multiple source formats. However, perceived image quality on the electronic display may be affected by compatibility between sub-pixel layout of the electronic display and the received source format. For example, when the source format is a red-green-blue format, both the first electronic display and the second electronic display may be capable of displaying the image since both include green sub-pixels, blue sub-pixels, and red sub-pixels. However, due at least in part to its sub-pixel layout, displaying the image on the second electronic display directly using image data in the red-green-blue format may affect perceived image quality, for example, by causing an edge to be perceived with a more blurred appearance.

Accordingly, the present disclosure provides techniques to facilitate improving perceived image quality of an electronic display by accounting for its sub-pixel layout and source format of image data. To facilitate improving perceived image quality, in some embodiments, a display pipeline may process image data before the image data is used to display an image on the electronic display. For example, the display pipeline may include a sub-pixel layout resampler (SPLR) block that converts image data from a source format (e.g., RGB format) into a display format (e.g., GR format, GB format, or GRGB format).

In some embodiments, the display pipeline may determine display pixel image data (e.g., image data in display format) by filtering (e.g., interpolating or sub-sampling) image pixel image data (e.g., image data in source format)

in a horizontal direction and/or a vertical direction. For example, the display pipeline may determine offset sub-pixel image data that indicates target luminance of an offset sub-pixel by filtering image data corresponding with a group (e.g., 2×2, 4×4, 6×6, or 8×8) of image pixels centered around the offset sub-pixel. In some embodiments, when in a default filter mode, the display pipeline may determine the offset sub-pixel image data by equally interpolating (e.g., averaging) the group of image pixels. However, in some instances, the default filter mode may result in a more gradual luminance change, which may result in an edge having a more blurred appearance.

To improve perceived image quality, the display pipeline may adaptively adjust filter parameters (e.g., filter mode, filter phases, filter coefficients, and/or filter type) used to determine the display pixel image data. In some embodiments, the display pipeline may adaptively adjust filter parameters based at least in part on edge parameters that, for example, indicate whether an edge is expected to be present at the offset sub-pixel and/or expected direction of the edge at the offset sub-pixel. For example, the display pipeline may switch from the default filter mode to a directional filter mode when an edge is expected to be present. In some embodiments, the directional filter mode may apply a sharper (e.g., more aggressive) filter along the expected direction of the edge to increase sharpness. However, in some instances, applying a more aggressive filter may result in a perceivable visual artifact, such as color fringing, along the edge.

Thus, in some embodiments, the display pipeline may adaptively adjust the filter parameters applied along an edge to strike a balance between perceived sharpness of the edge and likelihood of causing a perceivable visual artifact. For example, in some embodiments, the display pipeline may determine offset filter phase values that indicate variation of the directional filter mode from the default filter mode based at least in part on the expected direction of the edge. Furthermore, in some embodiments, the display pipeline may determine offset filter coefficients that indicate filtering strength used to implement the offset filter phase values. In this manner, the display pipeline improve perceived image quality of the edge when displayed on the electronic display by adaptively adjusting the filter parameters applied along the edge.

In some embodiments, the display pipeline may determine the edge parameters based at least in part on difference metrics between a current image pixel block (e.g., 2×2) centered around the offset sub-pixel and multiple (e.g., eight) offset image pixel blocks (e.g., 2×2) each offset from the current image pixel block, for example, in a horizontal direction, a vertical direction, a forty-five degree direction, or a one-hundred thirty-five degree direction. Additionally, in some embodiments, each difference metric may be determined based at least in part on a sum-of-absolute difference between the current image pixel block and one or more offset image pixel block offset from the current image pixel block in the same direction. In this manner, the display pipeline may determine similarity of the current image pixel block with each of the plurality of offset image pixel blocks.

Since an edge generally results in relatively similar image data along the edge, the display pipeline may determine that the expected direction of the edge at the offset image pixel is a direction corresponding with the best (e.g., lowest) difference metric. Additionally, the best difference metric may facilitate determining whether an edge is expected to be present at the offset sub-pixel. For example, the display pipeline may determine that the current image pixel block is not sufficiently similar to one or more offset image pixel blocks in the expected direction when the best difference metric is greater than a metric threshold and, thus, that an edge is not expected to be present at the offset sub-pixel.

Additionally, since an edge generally runs in a single direction, difference between image pixels along the edge should be much lower than image pixels in a direction orthogonal to the edge. Thus, in some embodiments, the best difference metric along with an orthogonal difference metric (e.g., difference metric in direction orthogonal to the expected direction) may facilitate determining whether an edge is expected to be present at the offset sub-pixel. For example, the display pipeline may determine that the current image pixel block is not sufficiently different from one or more offset image pixel blocks in the orthogonal direction when the difference between the best difference metric and the orthogonal difference metric is less than a difference threshold and, thus, that an edge is not expected to be present at the offset sub-pixel.

Furthermore, since an edge generally results in relatively similar image data along the edge, the display pipeline may determine expected direction of an edge in one or more neighbor image pixel block offset from the current image pixel block in the expected direction of the edge. In this manner, the display pipeline may determine that an edge is not expected to be present when the expected direction in the current image block does not match the expected direction in any of the one or more neighbor image pixel blocks. On the other hand, the display pipeline may determine that the edge is expected to be present when the best difference metric is not greater than the metric threshold, difference between the best difference metric and the orthogonal difference metric is not less than the difference threshold, and the expected direction in the current image block matches at least the expected direction in at least one neighbor image pixel block.

Nevertheless, in some instances, an edge may be inadvertently identified, for example, when the offset sub-pixel is located in a high frequency region (e.g., rapid changes in target luminance) of the image. Since filter parameters may be adaptively adjusted to increase sharpness when an edge is expected to be present, applying such filter parameters when the edge is not actually present may affect perceived image quality on the electronic display.

Thus, in some embodiments, the filter parameters applied may be adaptively adjusted based at least in part on certainty of whether an edge is actually present. For example, the display pipeline may determine high frequency (e.g., high-pass) metrics that indicate whether the offset sub-pixel is expected to be located in a high frequency region of the image. In other words, based at least in part on the high frequency statistics, the display pipeline may determine likelihood an edge is inadvertently identified due to being located in a high frequency region. As such, the display pipeline may adaptively adjust directional filter parameters applied at the offset sub-pixel based at least in part on the high frequency metrics, for example, toward default filter parameters (e.g., default filter mode and/or default filter phase values). In this manner, the applied filter parameters may be adaptively adjusted to balance certainty of the edge actually being present, thereby improving overall perceived image quality of the electronic display.

BRIEF DESCRIPTION OF THE DRAWINGS

Various aspects of this disclosure may be better understood upon reading the following detailed description and upon reference to the drawings in which:

FIG. 13 is a flow diagram of a process for determining directional difference metrics associated with neighbor input pixel blocks used in the sub-pixel layout resampler block of FIG. 8, in accordance with an embodiment;

FIG. 14 is a flow diagram of a process for determining high frequency metrics used in the sub-pixel layout resampler block of FIG. 8, in accordance with an embodiment;

FIG. 15 is a flow diagram of a process for determining high frequency metrics associated with one direction, in accordance with an embodiment;

DETAILED DESCRIPTION

Figure 1:
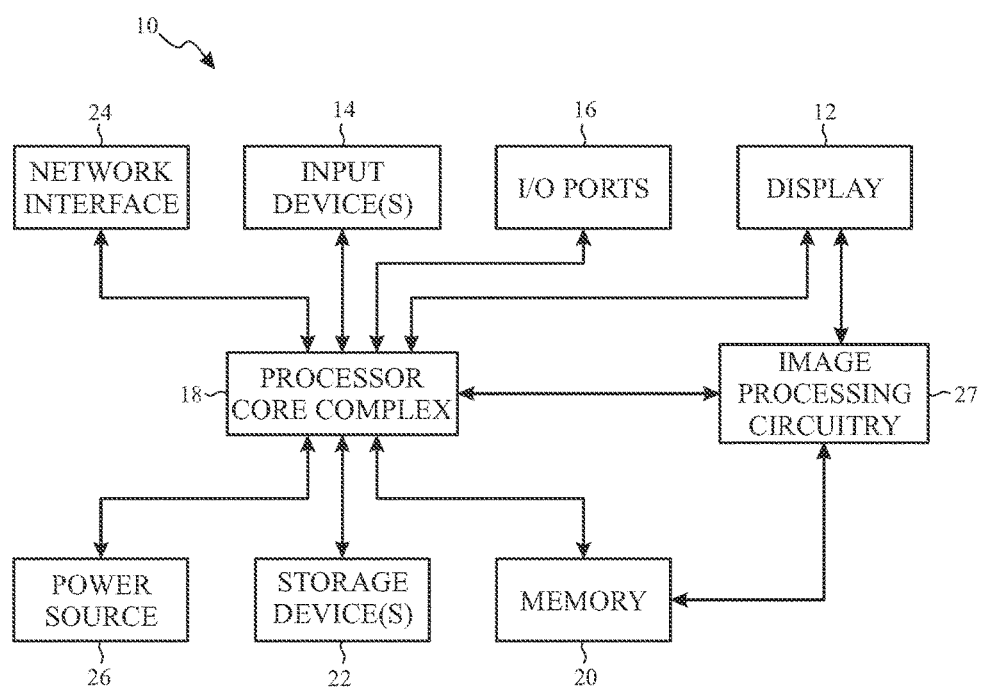
FIG. 1 is a block diagram of an electronic device used to display image frames, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to electronic displays, which may be used to present visual representations of information, for example, as one or more images in one or more image frames. To display an image, an electronic display may control light emission from display pixels based at least in part on image data that indicates target characteristics of the image. For example, the image data may indicate target luminance (e.g., brightness) of specific color components in a portion (e.g., image pixel) of the image, which when blended (e.g., averaged) together may result in perception of a range of different colors.

To facilitate outputting the specific color components, an electronic display may include multiple sub-pixels, which each controls luminance of one color component at a display pixel. For example, the electronic display may include red sub-pixels that control luminance of a red component, green sub-pixels that control luminance of a green component, and blue sub-pixels that controls luminance of a blue component. In some embodiments, each display pixel generally corresponds to one image pixel, but may include different color components and/or a sub-pixel offset from the image pixel. For example, the image pixel may include a red color component, a green color component, and a blue color component, whereas a corresponding display pixel includes a green sub-pixel co-located with the image pixel and a red sub-pixel offset from the image pixel.

Even when utilizing similar color component sub-pixels, different electronic displays may implement different sub-pixel layouts. In some instances, the number of sub-pixels per display pixels in different electronic displays may vary. For example, in a first electronic display, each display pixel may include three sub-pixels. On the other hand, in a second electronic display, each display pixel may include two sub-pixels. Moreover, display pixels in other electronic displays may include any suitable number of sub-pixels, for example, between one sub-pixel per display pixel to five or more sub-pixels per display pixel.

Additionally, in some instances, color component of the sub-pixels included in display pixels of different electronic displays may vary. For example, in the first electronic display, each display pixel may include a red sub-pixel, a green sub-pixel, and a blue sub-pixel. On the other hand, in the second electronic display, some (e.g., approximately half) of the display pixels may each include a green sub-pixel and a red sub-pixel while the other display pixels each include a green sub-pixel and a blue sub-pixel. Moreover, display pixels in other electronic displays may include any suitable combination of color component sub-pixels, for example, with multiple sub-pixels of the same color component per display pixel.

Furthermore, in some instances, location of the sub-pixels within display pixels of different electronic displays may vary. For example, in the first electronic display, space (e.g., distance) between the sub-pixels may be smaller. As such, perceivability of the space may be lower and, thus, the sub-pixels in a display pixel may generally be considered as co-located. On the other hand, in the second electronic display, space between the sub-pixels may be larger due to each sub-pixel acting more like a point source. As such, perceivability of the space may be higher and, thus, the sub-pixels in a display pixel of the second electronic display may generally be considered as offset from one another.

In some instances, operation of an electronic display to display an image may be dependent on its sub-pixel layout. In other words, to display the same image, operation of electronic displays implementing different sub-pixel layouts may vary. Nevertheless, to improve operational flexibility, an electronic display may be capable of displaying an image based on image data in any one of multiple formats. For example, an image data source may output image data in a red-green-blue (RGB) format, which indicates target luminance of a red component, target luminance of a green component, and target luminance of a blue component at locations (e.g., image pixels) in the image.

Based at least in part on image data of an image pixel, an electronic display may control luminance of its display pixels. For example, since display pixels in the first electronic display each including a set of co-located red, green, and blue sub-pixels, the first electronic display may display an image directly using RGB image data. On the other hand, the second electronic display may utilize display pixels each including a pair sub-pixels (e.g., a green sub-pixel and a red sub-pixel or a green sub-pixel and blue sub-pixel), in which location of one sub-pixel is offset from location of the other sub-pixel. Thus, in some instances, displaying an image on the second electronic display directly using RGB image data may affect perceived image quality, for example, by causing an edge to be perceived with a more blurred appearance.

Accordingly, the present disclosure provides techniques for improving perceived image quality of an electronic display, for example, by converting image data from a source format (e.g., RGB format) into a display format (e.g., GRGB format) more compatible with a sub-pixel layout of the electronic display before using the image data to display an image on the electronic display. To facilitate converting format, in some embodiments, a display pipeline may process the image data before the image is displayed. In particular, the display pipeline may include a sub-pixel layout resampler (SPLR) block that determines display pixel image data (e.g., image data in display format) by filtering (e.g., interpolating or sub-sampling) image pixel image data (e.g., image data in source format).

As described above, in some embodiments, a display pixel may include fewer color components than an image pixel and/or include a sub-pixel offset from the image pixel. For example, image data of an image pixel may include three color components, whereas the display pixel includes two color components. Additionally or alternatively, the display pixel may include a first sub-pixel (e.g., green) co-located with the image pixel and a second (e.g., red or blue) sub-pixel offset from the image pixel. Thus, the display pixel image data corresponding with a display pixel may include at least image data indicating target luminance of the co-located sub-pixel and image data indicating target luminance of the offset sub-pixel.

In some embodiments, the sub-pixel layout resampler block may determine the offset sub-pixel image data by filtering the image pixel image data based at least in part on surrounding image pixel image data. For example, the sub-pixel layout resampler block may apply a low pass filter (e.g., default filter parameters) to determine the offset sub-pixel image data by equally averaging corresponding color component image data of surrounding image pixels. Since offset from the surrounding image pixels, determining the sub-pixel image data in this manner may result in a more gradual luminance change. However, in some instances, the more gradual luminance change may result in an edge having a more blurred appearance when displayed on the electronic display. In other words, in some instances, applying the default filter parameters may result in a line being perceived as wider and/or less sharp.

To prove perceived image quality, the sub-pixel layout resampler block may adaptively adjust filter parameters (e.g., filter mode, filter phases, filter coefficients, and/or filter type) used to determine the display pixel image data. For example, the sub-pixel layout resampler block may determine likelihood of an edge being located at the offset sub-pixel, determine expected direction of the edge, and adjust the filter parameters used to determine the offset sub-pixel image data accordingly. In this manner, the sub-pixel layout resampler block may adjust the filter parameters applied at offset sub-pixels along an edge, for example, to increase perceived sharpness of the edge by increasing filtering aggressiveness (e.g., strength).

However, in some instances, applying a more aggressive filter may result in a perceivable visual artifact, such as color fringing, along the edge. Thus, in some embodiments, the display pipeline may adaptively adjust filter parameters applied at offset sub-pixels along an edge to strike a balance between perceived sharpness of the edge and likelihood of causing a perceivable visual artifact.

In some embodiments, the sub-pixel layout resampler block may determine the likelihood and/or expected direction of an edge based at least in part on directional difference metrics associated with a current image pixel block surrounding the offset pixel and/or difference metrics associated with neighbor image pixel blocks. For example, the directional difference metrics of an image pixel block may include the sum-of-absolute difference (SAD) of the image pixel block compared to image pixel blocks shifted in a vertical direction, a horizontal direction, a forty-five degree direction, and/or a one hundred thirty-five degree direction. Additionally, in some embodiments, the sub-pixel layout resampler block may determine the likelihood of the edge based at least in part on whether the offset sub-pixel is expected to be located in a high frequency region, for example, indicated by high frequency metrics.

Additionally, the sub-pixel resampler block may determine whether pixel response of the co-located sub-pixel is expected to vary from pixel response of the offset sub-pixel and adjust filter parameters used to determine the co-located sub-pixel image data accordingly. In some embodiments, difference between pixel response of the co-located sub-pixel and pixel response of the offset sub-pixel may depend on changes in target luminance (e.g., gray level). For example, larger increases in target luminance may result in larger differences between the pixel responses. Thus, the sub-pixel layout resampler block may adjust filter parameters applied at co-located pixels, for example, to apply a low-pass filter that reduces likelihood of differences in pixel response causing a perceivable visual artifact.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

In the depicted embodiment, the electronic device 10 includes the electronic display 12, input devices 14, input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. In some embodiments, the local memory 20 and/or the main memory storage device 22 may be tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and the like.

In some embodiments, the processor core complex 18 may execute instruction stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

As depicted, the processor core complex 18 is also operably coupled with the network interface 24. Using the network interface 24, the electronic device 10 may be communicatively coupled to a network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

Additionally, as depicted, the processor core complex 18 is operably coupled to the power source 26. In some embodiments, the power source 26 may provide electrical power to operate the processor complex core 18 and/or other components in the electronic device 10. Thus, the power source 26 may include any suitable source of energy, such as a rechargeable lithium polymer (Li-poly) battery and/or an alternating current (AC) power converter.

Furthermore, as depicted, the processor core complex 18 is operably coupled with I/O ports 16 and the input devices 14. In some embodiments, the I/O ports 16 may enable the electronic device 10 to interface with various other electronic devices. Additionally, in some embodiments, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

In addition to enabling user inputs, the electronic display 12 may facilitate providing visual representations of information by displaying images (e.g., in one or more image frames). For example, the electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control luminance of one color component (e.g., red, blue, or green).

As described above, the electronic display 12 may display an image by controlling luminance of the sub-pixels based at least in part on corresponding image data (e.g., image pixel image data and/or display pixel image data). In some embodiments, the image data may be received from another electronic device, for example, via the network interface 24 and/or the I/O ports 16. Additionally or alternatively, the image data may be generated by the processor core complex 18 and/or the image processing circuitry 27.

Figure 2:
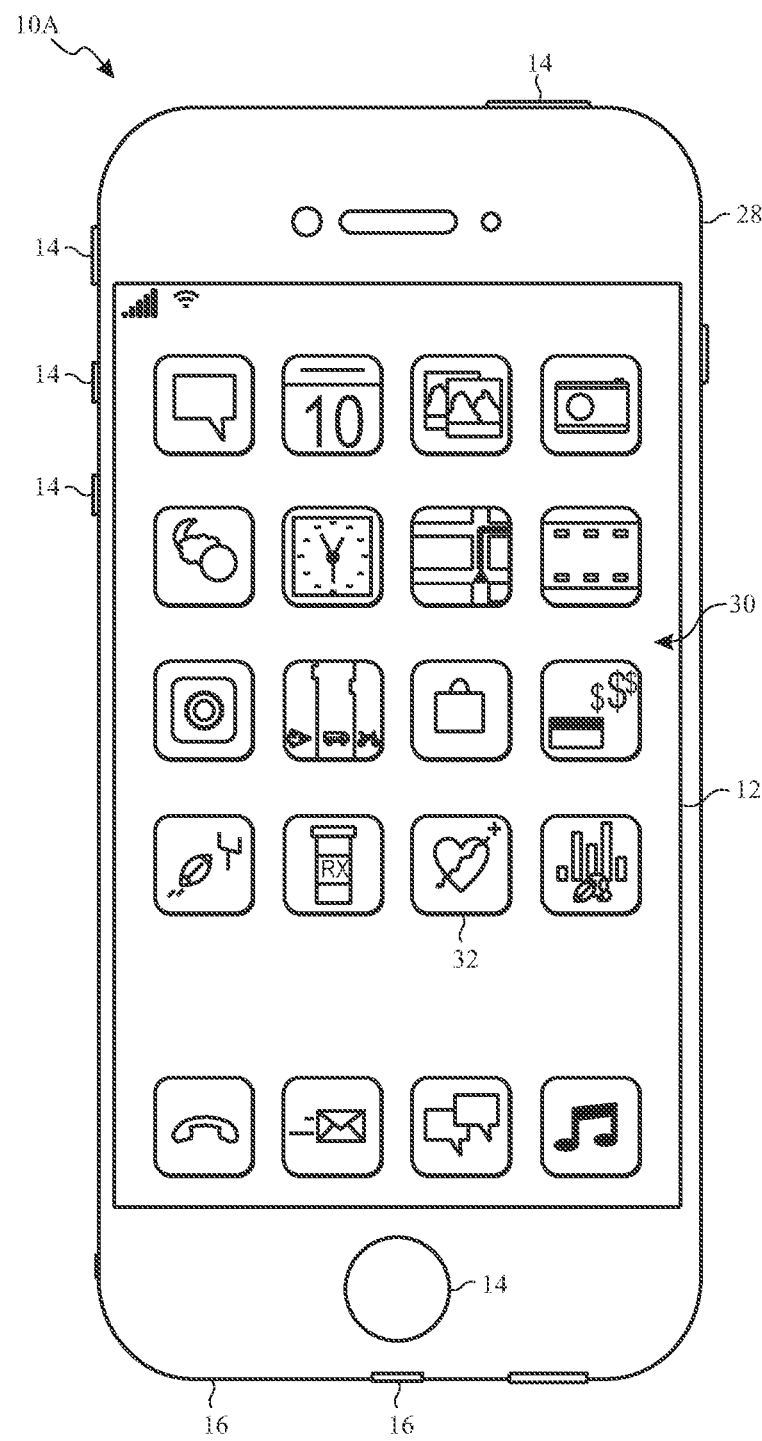
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
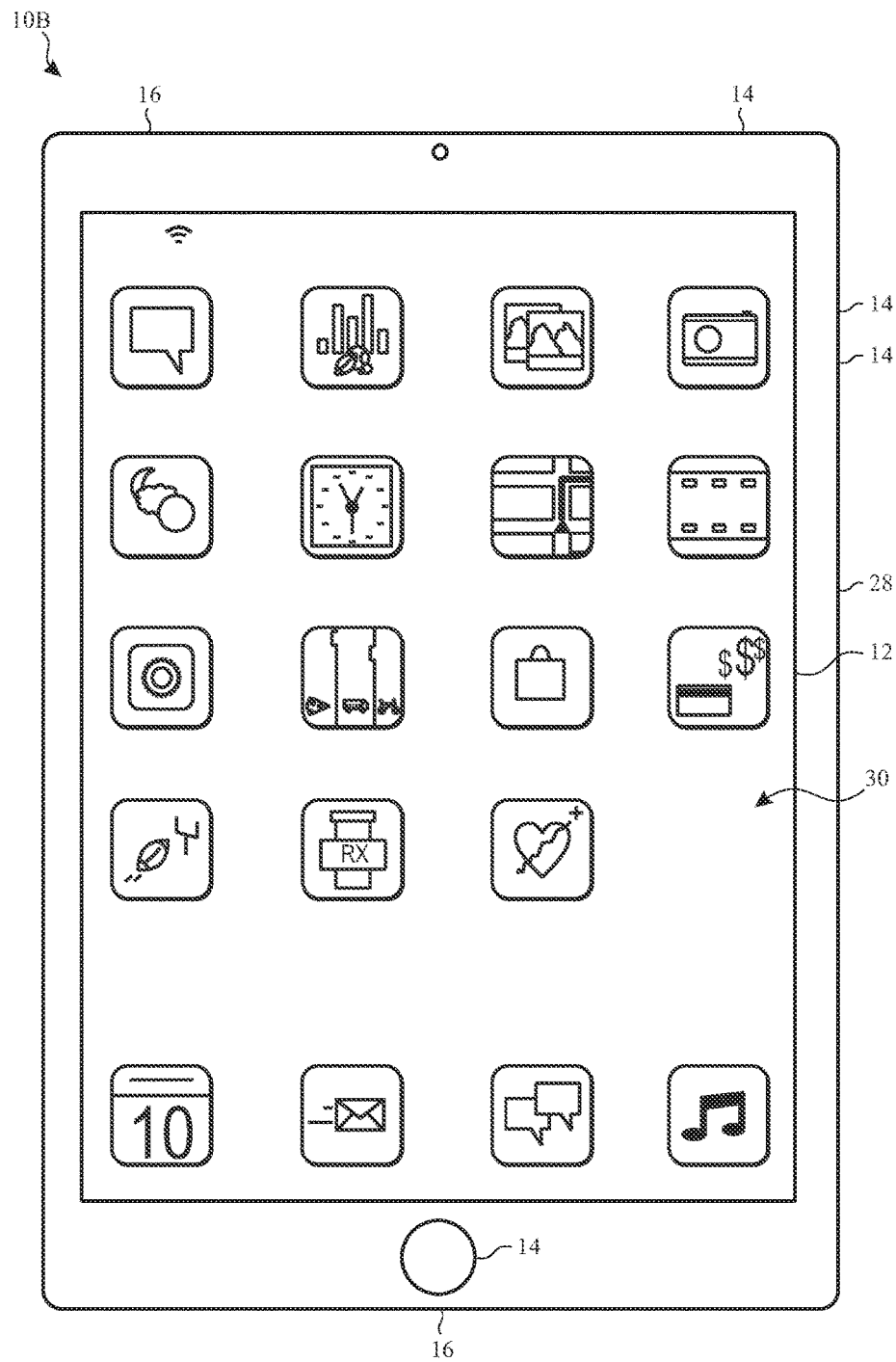
FIG. 3 is an example of the electronic device of FIG. 1, in accordance with an embodiment.
Figure 4:
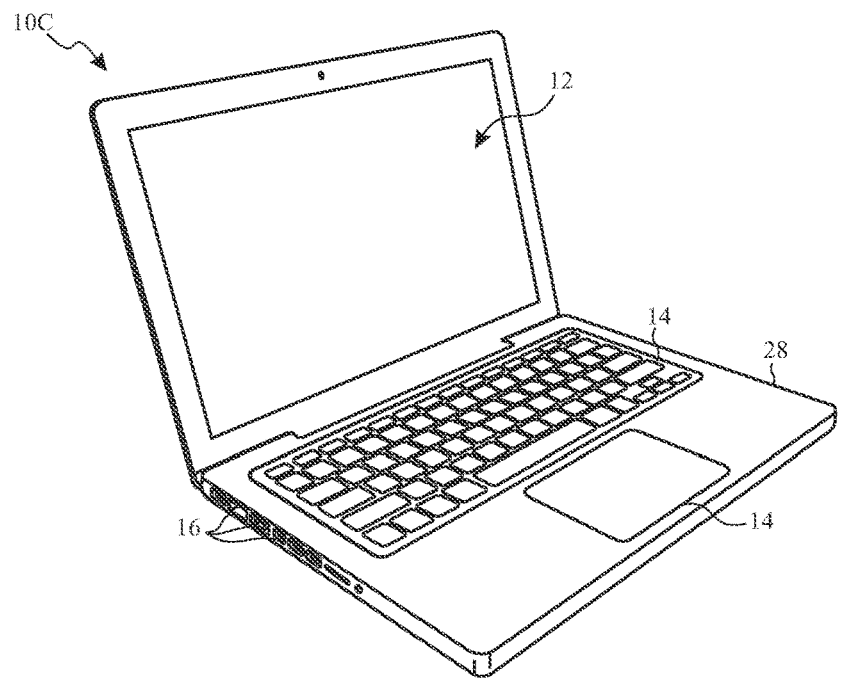
FIG. 4 is an example of the electronic device of FIG. 1, in accordance with an embodiment.
Figure 5:
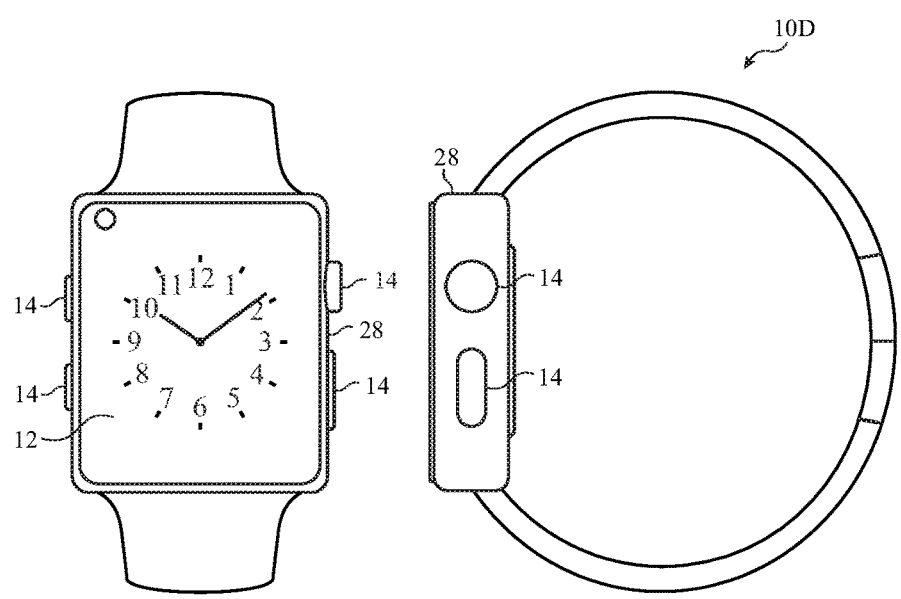
FIG. 5 is an example of the electronic device of FIG. 1, in accordance with an embodiment.
Figure 6:
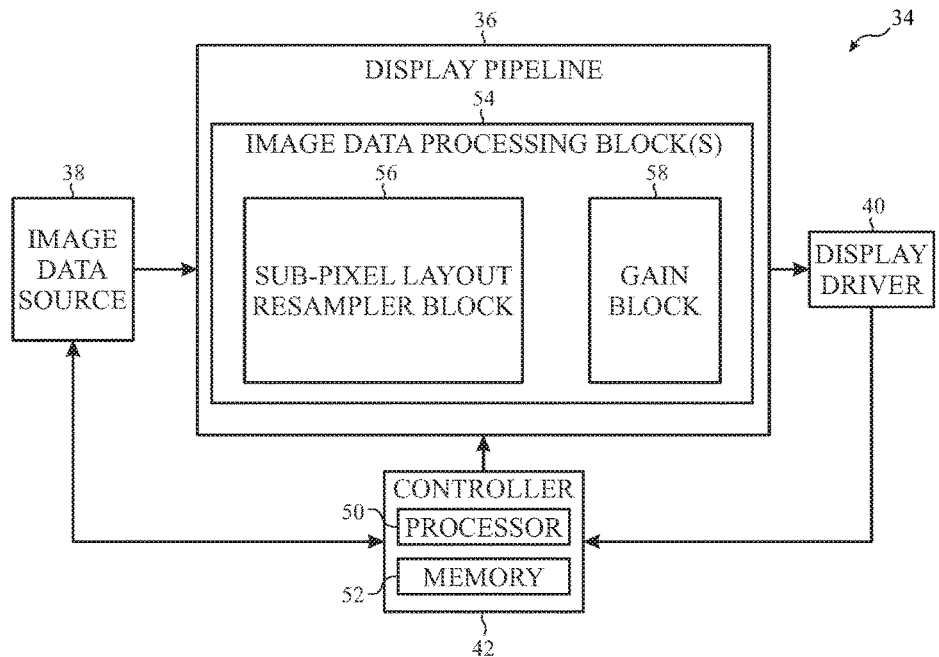
FIG. 6 is a block diagram of a display pipeline in the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, the electronic display 12 may display images based at least in part on image data received, for example, from the processor core complex 18 and/or the image processing circuitry 27. Additionally, as described above, the image data may be processed before being used to display an image on the electronic display 12. In some embodiments, a display pipeline may process the image data, for example, to convert from a source format (e.g., RGB format) to a display format (e.g., GRGB format). As will be described in more detail below, converting to the display format may facilitate converting image pixel image data, which describes target luminance of image pixels, into display pixel image data, which describes target luminance of co-located sub-pixels and target luminance of offset sub-pixels.

To help illustrate, a portion 34 of the electronic device 10 including a display pipeline 36 is described in FIG. 5. In some embodiments, the display pipeline 36 may be implemented by circuitry in the electronic device 10, circuitry in the electronic display 12, or a combination thereof. For example, the display pipeline 36 may be included in the processor core complex 18, the image processing circuitry 27, a timing controller (TCON) in the electronic display 12, or any combination thereof.

As depicted, the portion 34 of the electronic device 10 also includes an image data source 38, a display driver 40, and a controller 42. In some embodiments, the controller 42 may control operation of the display pipeline 36, the image data source 38, and/or the display driver 40. To facilitate controlling operation, the controller 42 may include a controller processor 50 and controller memory 52. In some embodiments, the controller processor 50 may execute instructions stored in the controller memory 52. Thus, in some embodiments, the controller processor 50 may be included in the processor core complex 18, the image processing circuitry 27, a timing controller in the electronic display 12, a separate processing module, or any combination thereof. Additionally, in some embodiments, the controller memory 52 may be included in the local memory 20, the main memory storage device 22, a separate tangible, non-transitory, computer readable medium, or any combination thereof.

In the depicted embodiment, the display pipeline 36 is communicatively coupled to the image data source 38. In this manner, the display pipeline 36 may receive image data in the source format (e.g., RGB format) from the image data source 38. In some embodiments, the image data source 38 may be included in the processor core complex 18, the image processing circuitry 27, or a combination thereof.

As described above, the display pipeline 36 may process the image data received from the image data source 38. To process the image data, the display pipeline 36 may include one or more image data processing blocks 54. For example, in the depicted embodiment, the image data processing blocks 54 include a sub-pixel layout resampler (SPLR) block 56 and a gain block 58. In some embodiments, the image data processing blocks 54 may additionally or alternatively include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

After processing, the display pipeline 36 may output processed image data, such as display pixel image data, to the display driver 40. Based at least in part on the processed image data, the display driver 40 may apply analog electrical signals to the display pixels of the electronic display 12 to display images in one or more image frames. In this manner, the display pipeline 36 may operate to facilitate providing visual representations of information on the electronic display 12.

Figure 7:
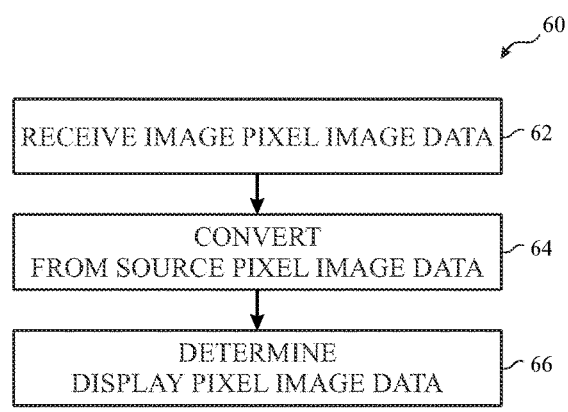
FIG. 7 is a flow diagram of a process for displaying an image frame, in accordance with an embodiment.

To help illustrate, one embodiment of a process 60 for operating the display pipeline 36 is described in FIG. 7. Generally, the process 60 includes receiving image pixel image data (process block 62), converting image data from a source format to a display format (process block 64), and determining display pixel image data (process block 66). In some embodiments, the process 60 may be implemented based on circuit connections formed in the display pipeline 36. Additionally or alternatively, in some embodiments, the process 60 may be implemented by executing instructions stored in a tangible non-transitory computer-readable medium, such as the controller memory 52, using processing circuitry, such as the controller processor 50.

As described above, the display pipeline 36 may receive image pixel image data from the image data source 38 (process block 62). In some embodiments, the image pixel image data may indicate target luminance of color components at locations (e.g., image pixels) in the image. Additionally, in some embodiments, the image pixel image data may be in a source format, such as a red-green-blue (RGB) format that indicates target luminance of a red component at an image pixel, target luminance of a blue component at the image pixel, and target luminance of a green component at the image pixel.

Furthermore, the controller 42 may instruct the display pipeline 36 to process the image pixel image data to convert from the source format to a display format (process block 64) and to determine corresponding display pixel image data based at least in part on the conversion to the display format (process block 66). In some embodiments, the display pipeline 36 may determine the display format may be based at least in part on layout of sub-pixels in the electronic display 12. For example, when some display pixels include green and red sub-pixels while other display pixels include green and blue sub-pixels, the display format may be a green-red and green-blue (GRGB) format. As described above, in some embodiments, the sub-pixel layout resampler block 56 may convert to the display format and/or determine the display pixel image data.

Figure 8:
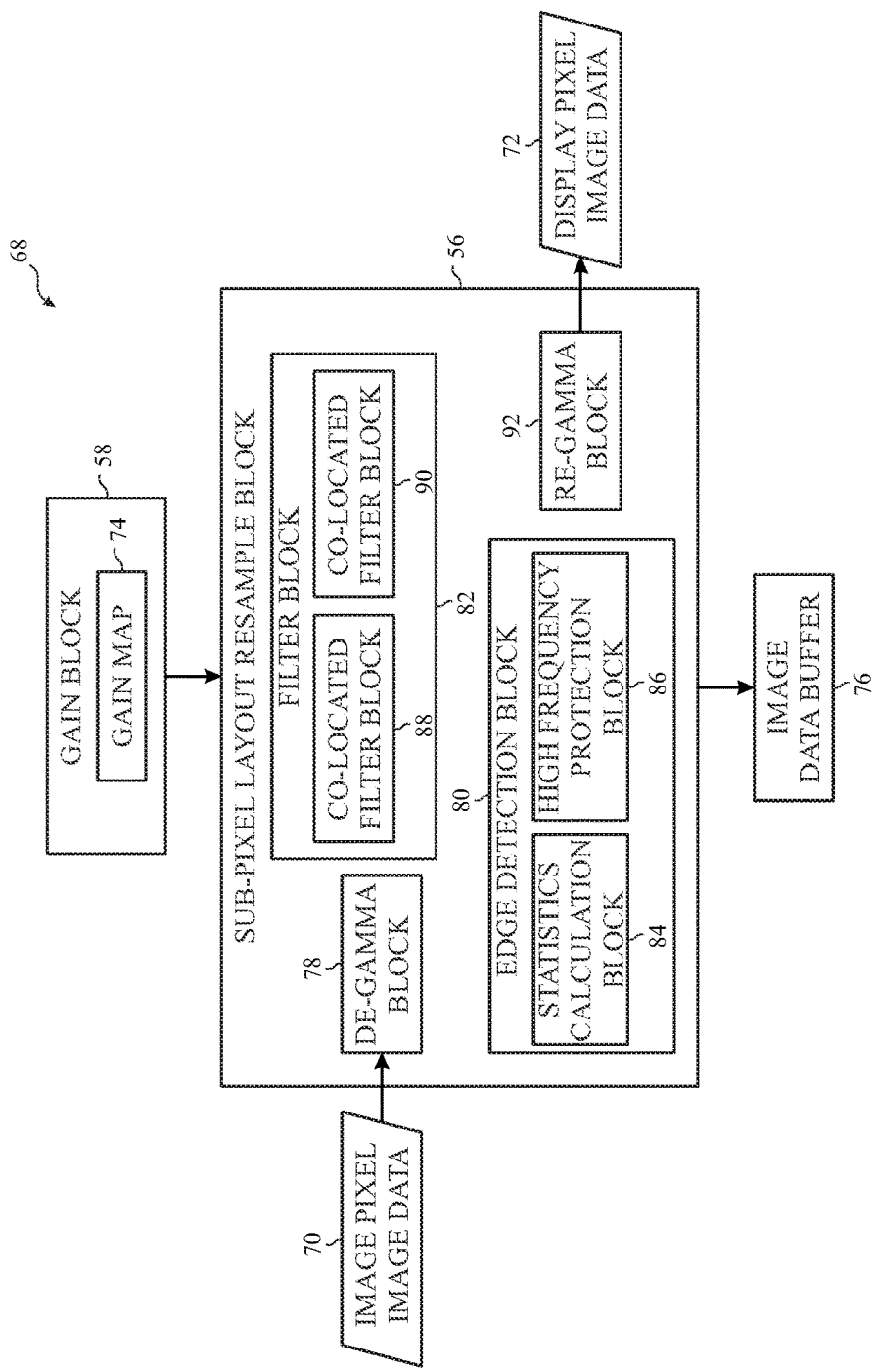
FIG. 8 is a block diagram of a sub-pixel layout resampler block and a gain block in the display pipeline of FIG. 6, in accordance with an embodiment.

To help illustrate, a portion 68 of the display pipeline 36 including the sub-pixel layout resampler block 56 is shown in FIG. 8. As depicted, the sub-pixel layout resampler block 56 receives image pixel image data 70 corresponding with a current image pixel and outputs display pixel image data 72 corresponding with a current display pixel. In some embodiments, the sub-pixel layout resampler block 56 may receive the image pixel image data 70 from another image data processing block 54 and/or from the image data source 38. Additionally, in some embodiments, the sub-pixel layout resampler block 56 may output the display pixel image data 72 to another image data processing block 54 and/or the display driver 40.

To facilitate generating the display pixel image data 72, the sub-pixel layout resampler block 56 may be communicatively coupled to the gain block 58 and/or an image data buffer 76. In some embodiments, the gain block 58 may include a gain map 74, which indicates gain values to apply to image data corresponding to specific display pixels. Additionally, in some embodiments, the image data buffer 76 may store image data corresponding with other image pixels, for example, neighboring the current image pixel. In this manner, as will be described in more detail below, the sub-pixel layout resampler block 56 may generate the display pixel image data 72 based at least in part on image data corresponding to a group of image pixels around the current image pixel received from the image data buffer 76 and/or gain values received from the gain block 58.

Additionally, to facilitate generating the display pixel image data 72, the sub-pixel layout resampler block 56 may include a de-gamma block 78, an edge detection block 80, a filter block 82, and a re-gamma block 92. In some embodiments, the image pixel image data 70 may be in a gamma (e.g., non-linear) domain. To facilitate processing, the de-gamma block 78 may convert the image pixel image data 70 from the gamma domain to a linear domain.

Additionally, the edge detection block 80 may determine edge parameters, such as likelihood of an edge occurring at an offset sub-pixel of the current display pixel and/or expected direction of the edge at the offset sub-pixel. In some embodiments, the edge detection block 80 may determine edge parameters based at least in part on characteristics of the offset sub-pixel, such as gradient of a region of the image around the offset sub-pixel. To facilitate determining the characteristics, the edge detection block 80 may include a statistics calculation block 84 that determines statistics indicative of the characteristics. For example, the statistics calculation block 84 may determine difference metrics (e.g., sum-of-absolute difference) between image pixel blocks around the offset sub-pixel, which may be indicative of gradient around the offset sub-pixel and, thus, used to determine the edge parameters.

In some instances, the statistics may inadvertently indicate occurrence of an edge at the offset sub-pixel, for example, when located in a high frequency area. Thus, the edge detection block 80 may include a high frequency protection block 86 that determines high frequency metrics to indicate likelihood the offset sub-pixel is located in a high frequency region of an image. In some embodiments, the high frequency protection block 86 may determine the high frequency metrics based at least in part on change in target luminance in a region surrounding the offset sub-pixel.

Furthermore, the filter block 82 may convert the image pixel image data from the source (e.g., RGB) format to the display (e.g., GRGB) format based at least in part on the edge parameters. To convert into the display format, in some embodiments, the filter block 82 may determine and apply filter parameters to the image pixel image data 70. For example, the filter block 82 may filter (e.g., interpolate or sub-sample) the image pixel image data 70 in the RGB format to generate display pixel image data 72 in the green-red (GR) format and/or the green-blue (GB) format. In other words, the filter block 82 may determine image data corresponding with the offset sub-pixel and image data corresponding with a co-located sub-pixel of the current display pixel.

In some embodiments, the offset sub-pixel image data and the co-located sub-pixel image data may be separately determined. For example, in the depicted embodiments, the filter block 82 includes a co-located filter block 88 that determines and applies co-located filter parameters on a corresponding color component of the image pixel image data 70 to determine the co-located sub-pixel image data. Additionally, the filter block 82 includes an offset filter block 90 that determines and applies offset filter parameters on a corresponding color component of the image pixel image data 70 to determine the offset sub-pixel image data.

As described above, the filter block 82 may facilitate improving perceived image quality by adaptively adjusting the filter parameters used to determine the display pixel image data 72. For example, the co-located filter block 88 may adaptively adjust the co-located filter parameters to reduce difference between pixel response of co-located sub-pixels and offset sub-pixels. In some embodiments, the co-located filter parameters may include filter coefficients, which control strength of applied filtering. Additionally, in some embodiments, the co-located filter parameters may include filter type that, for example, indicates whether to apply a non-separable N×N filter or a separable M×1 horizontal filter and a 1×M vertical filter.

Additionally, the offset filter block 90 may adaptively adjust the offset filter parameters based on the edge parameters, for example, to improve sharpness of edges occurring at offset sub-pixels. In some embodiments, the offset filter parameters may include a filter mode, which may be default filter mode when an edge is not expected to be present or a directional filter mode (e.g., a vertical mode, a horizontal mode, a forty-five degree mode, or a one hundred thirty-five degree mode) when an edge is expected to be present. Additionally, in some embodiments, the offset filter parameters may include filter phases, which indicates variation of a directional filter mode from the default filter mode. Furthermore, in some embodiments, the filter parameters may include filter coefficients, which control strength of filtering applied to implement the filter phases.

In some embodiments, the display pixel image data 72 may be used by subsequent image processing blocks 54 that expect to receive image data in the gamma domain and/or in the source format. Since determined in the linear domain, the re-gamma block 92 may convert the display pixel image data 72 to the gamma domain. Additionally, since in the display format, the sub-pixel layout resampler block 56 may upscale the display pixel image data 72 to the source format. For example, when first display pixel image data 72 includes a green component and a red component, second display pixel image data 72 generated directly before or after the first display pixel image data 72 may include a green component and a blue component. To convert to the source format, the sub-pixel layout resampler block 56 may copy the blue component of the second display pixel image data 72 to the first display pixel image data 72 and copy the red component of the first display pixel image data 72 to the second display pixel image data 72. In this manner, the sub-pixel layout resampler block 56 may operate to generate the display pixel image data 72 based at least in part on the image pixel image data 70.

Figure 9:
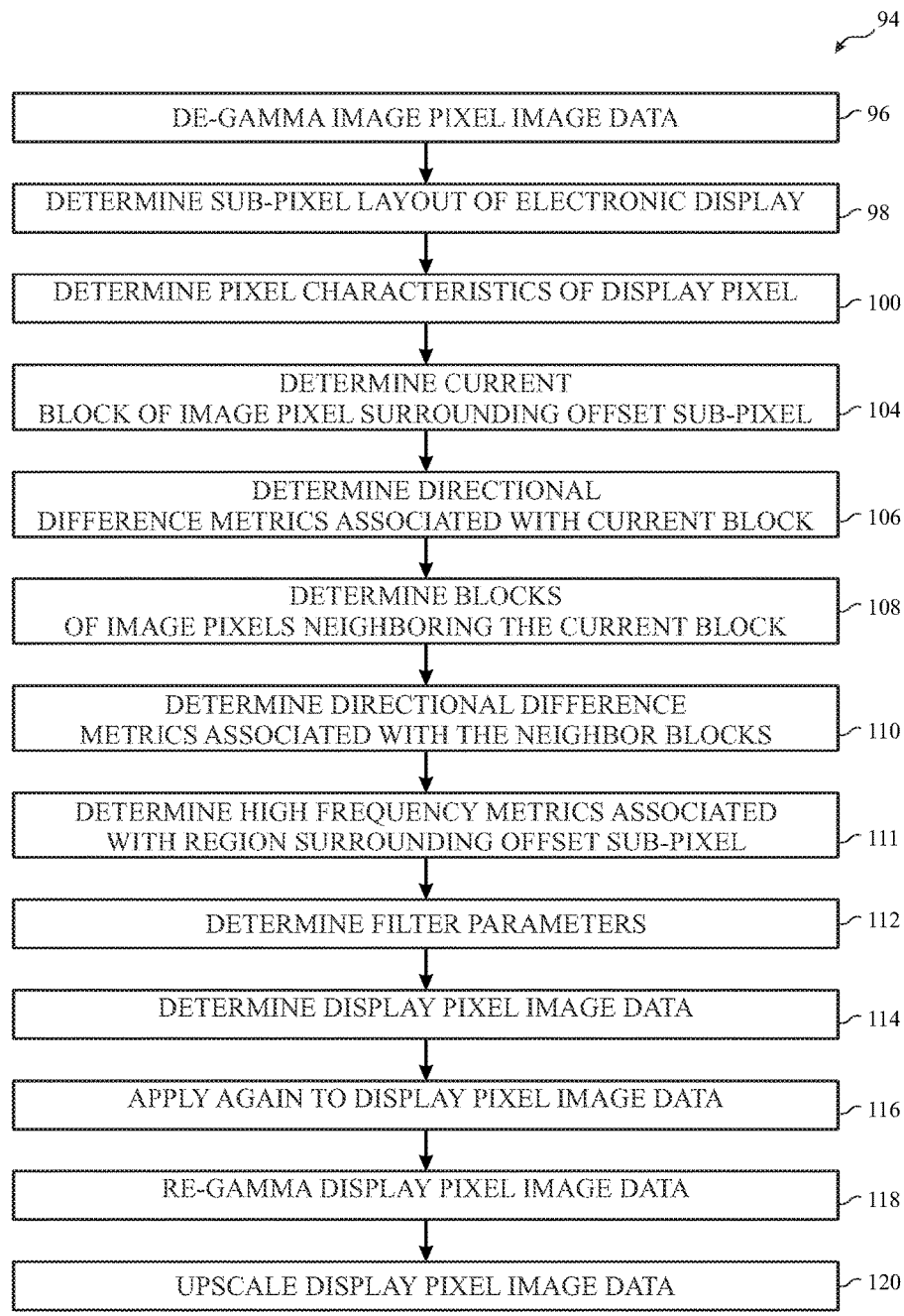
FIG. 9 is a flow diagram of a process for operating the sub-pixel layout resampler block of FIG. 8, in accordance with an embodiment.

To further illustrate, a flow diagram of a process 94 for operating a sub-pixel layout resampler block 56 is shown in FIG. 9. Generally, the process 94 includes de-gamma converting image pixel image data (process block 96), determining a sub-pixel layout of an electronic display (process block 98), determining pixel characteristics of a display pixel (process block 100), determining a current block of image pixels surrounding an offset sub-pixel (process block 104), determining directional difference metrics associated with the current block (process block 106), determining blocks of image pixels neighboring the current block (process block 108), determining directional difference metrics associated with the neighbor blocks (process block 110), determining high frequency metrics associated with a region surrounding the offset sub-pixel (process block 111), determining filter parameters (process block 112), determining display pixel image data (process block 114), applying a gain to the display pixel image data (process block 116), re-gamma converting the display pixel image data (process block 118), and upscaling the display pixel image data (process block 120). In some embodiments, the process 94 may be implemented based on circuit connections formed in the display pipeline 36. Additionally or alternatively, in some embodiments, the process 94 may be implemented by executing instructions stored in a tangible, non-transitory, computer-readable medium, such as the controller memory 52, using processing circuitry, such as the controller processor 50.

Accordingly, in some embodiments, the controller 42 may instruct the sub-pixel layout resampler block 56 to de-gamma convert image pixel image data (process block 96). As described above, the sub-pixel layout resampler block 56 may de-gamma by converting the image pixel image data 70 from a gamma domain to a linear domain. Additionally, in some embodiments, the controller 42 may instruct the sub-pixel layout resampler block 56 to determine sub-pixel layout of the electronic display 12 (process block 98). As described above, operation of different electronic displays 12 may vary when implementing different sub-pixel layouts. For example, in some electronic displays 12, the sub-pixels may be organized such that each display pixel includes co-located sub-pixels of each color component. On the other hand, in other electronic displays 12, the sub-pixels may be organized such that each display pixels includes sub-pixels of less than all color components, in which at least one of sub-pixels is offset from another and color components of different display pixels vary.

Figure 10:
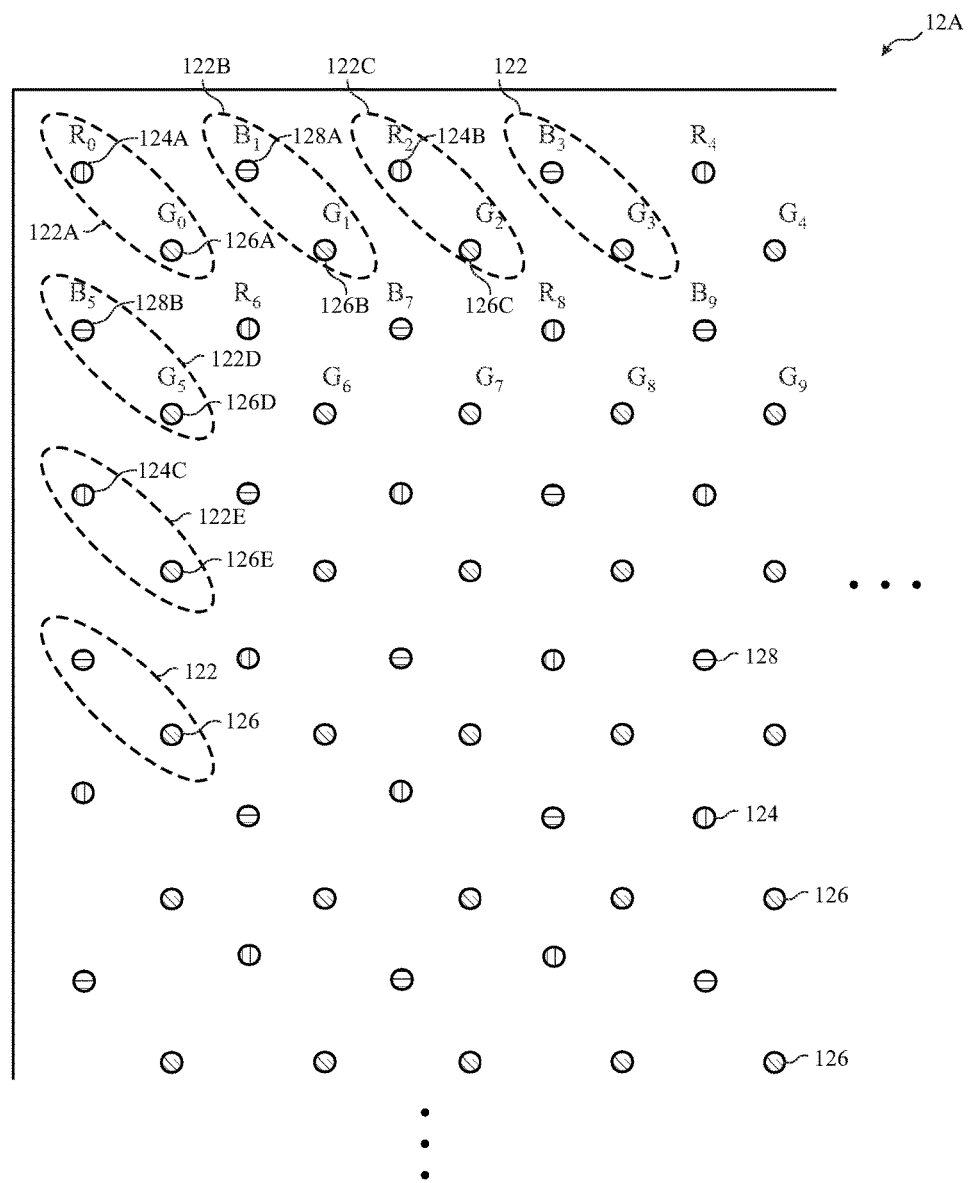
FIG. 10 is a representative diagram of display pixels in an electronic display used by the electronic device of FIG. 1, in accordance with an embodiment.

To help illustrate, one example of an electronic display 12A (e.g., an OLED electronic display) is shown in FIG. 10. As depicted, the electronic display 12A includes multiple display pixels 122 organized in rows and columns. For example, in the depicted embodiment, the electronic display 12A includes a first display pixel 122A, a second display pixel 122B, a third display pixel 122C, and so on organized in a first row. Additionally, the electronic display 12A includes the first display pixel 122A, a fourth display pixel 122D, a fifth display pixel 122E, and so on organized in a first column.

Furthermore, as depicted, the electronic display includes red sub-pixels 124, green sub-pixels 126, and blue sub-pixels 128. In the depicted embodiment, each display pixel 122 includes two sub-pixels—namely a green sub-pixel 126 and one of either a red sub-pixel 124 or a blue sub-pixel 128. Specifically, the display pixels 122 along a row or a column may alternate between including red sub-pixels 124 and including blue sub-pixels. For example, along the first row, the first display pixel 122A includes a first red sub-pixel 124A and a first green sub-pixel 126A, the second display pixel 122B includes a first blue sub-pixel 128A and a second green sub-pixel 126B, the third display pixel 122C includes a second red sub-pixel 124B and a third green sub-pixel 126C, and so on. Additionally, along the first column, the first display pixel 122A includes the first red sub-pixel 124A and the first green sub-pixel 126A, the fourth display pixel 122D includes a second blue sub-pixel 128B and a fourth green sub-pixel 126D, the fifth display pixel 122E includes a third red sub-pixel 124C and a fifth green sub-pixel 126E, and so on. As such, in some embodiments, each display pixel 122 may include a color component sub-pixel (e.g., red sub-pixel 124 or blue sub-pixel 128) different from each of its vertical and horizontal neighbor display pixels 122.

As described above, each display pixel 122 may correspond with an image pixel received from the image data source 38. With regard to the depicted embodiment, each display pixel 122 may correspond with an image pixel located at its green sub-pixel 126. In other words, the green sub-pixels 126 may be co-located with a corresponding image pixel. On the other hand, the red sub-pixels 124 and the blue sub-pixels 128 may be offset from the image pixels.

Moreover, in the depicted embodiment, the offset sub-pixel (e.g., red sub-pixel 124 or blue sub-pixel 128) is offset to the top left of the co-located sub-pixel (e.g., green sub-pixel 126). In other embodiments, the offset sub-pixel may be offset to the top right, bottom left, or bottom right of the co-located sub-pixel. Thus, when utilized with the electronic display 12A described in FIG. 10, the sub-pixel layout resampler block 56 may determine that the sub-pixels are laid out such that each display pixel 122 includes two sub-pixels, in which a green sub-pixel 126 is the co-located sub-pixel, an offset sub-pixel is located to the top left of the co-located sub-pixel, and the offset sub-pixel alternates between red sub-pixels 124 and blue sub-pixels 128. In some embodiments, the sub-pixel layout may be pre-determined and stored, for example, by a manufacturer in the controller memory 52.

Returning to the process 94 of FIG. 9, the controller 48 may instruct the sub-pixel layout resampler block 56 to determine pixel characteristics of a current display pixel 122 based at least in part on the sub-pixel layout (process block 100). In particular, the current display pixel 122 may correspond with a current image pixel described by the received image pixel image data. Thus, based on the location of the current image pixel and the sub-pixel layout, the sub-pixel layout resampler block 56 may determine location of a co-located sub-pixel in the current display pixel 122, color component of the co-located sub-pixel, location of an offset sub-pixel in the current display pixel 122, and/or color component of the offset sub-pixel.

Additionally, the controller 48 may instruct the sub-pixel layout resampler block 56 to determine a block of image pixels surrounding the current offset sub-pixel (process block 104) and to determine directional difference metrics associated with the current block of image pixels (process block 106). In some embodiments, the current block may be an N×N (e.g., 2×2) block of image pixels including the current image pixel that surround the current offset sub-pixel. Additionally, in some embodiments, the directional difference metrics may include difference metrics between the current block and blocks of image pixels offset from the current block.

Figure 11:
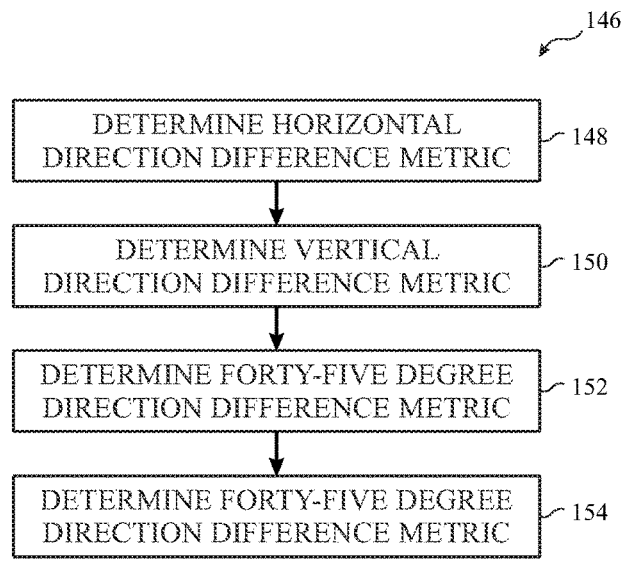
FIG. 11 is flow diagram of a process for determining directional difference metrics associated with an input pixel block used in the sub-pixel layout resampler block of FIG. 8, in accordance with an embodiment.

To help illustrate, one embodiment of a process 146 for determining directional difference metrics corresponding with a block of image pixels, such as a current block or a neighbor block, is described in FIG. 11. Generally, the process 146 includes determining a horizontal difference metric (process block 148), determining a vertical difference metric (process block 150), determining a forty-five degree difference metric (process block 152), and determining a one hundred thirty-five degree difference metric (process block 154). In some embodiments, the process 146 may be implemented based on circuit connections formed in the display pipeline 36. Additionally or alternatively, in some embodiments, the process 146 may be implemented by executing instructions stored in a tangible, non-transitory, computer-readable medium, such as the controller memory 52, using processing circuitry, such as the controller processor 50.

Accordingly, in some embodiments, the controller 42 may instruct the sub-pixel layout resampler block 56 to determine a horizontal difference metric (process block 148), a vertical difference metric (process block 150), a forty-five degree difference metric (process block 152), and a one hundred thirty-five degree difference metric (process block 154) associated with a block of image pixels. In some embodiments, the horizontal difference metric may be the sum-of-absolute difference between the image pixel block and one or more image pixel blocks offset in a horizontal direction. Additionally, the vertical difference metric may be the sum-of-absolute difference between the image pixel block and one or more image pixel blocks offset in a vertical direction. The forty-five degree difference metric may be the sum-of-absolute difference between the image pixel block and one or more image pixel blocks offset in a forty-five direction. Furthermore, the one hundred thirty-five degree difference metric may be the sum-of-absolute difference between the image pixel block and one or more image pixel blocks offset in a one hundred thirty-five degree direction. Thus, to determine the directional difference metrics, the sub-pixel layout resampler block 56 may determine one or more horizontal offset blocks, one or more vertical offset blocks, one or more forty-five degree offset blocks, and/or one or more one hundred thirty-five degree offset blocks from image pixels around the offset sub-pixel.

Figure 12:
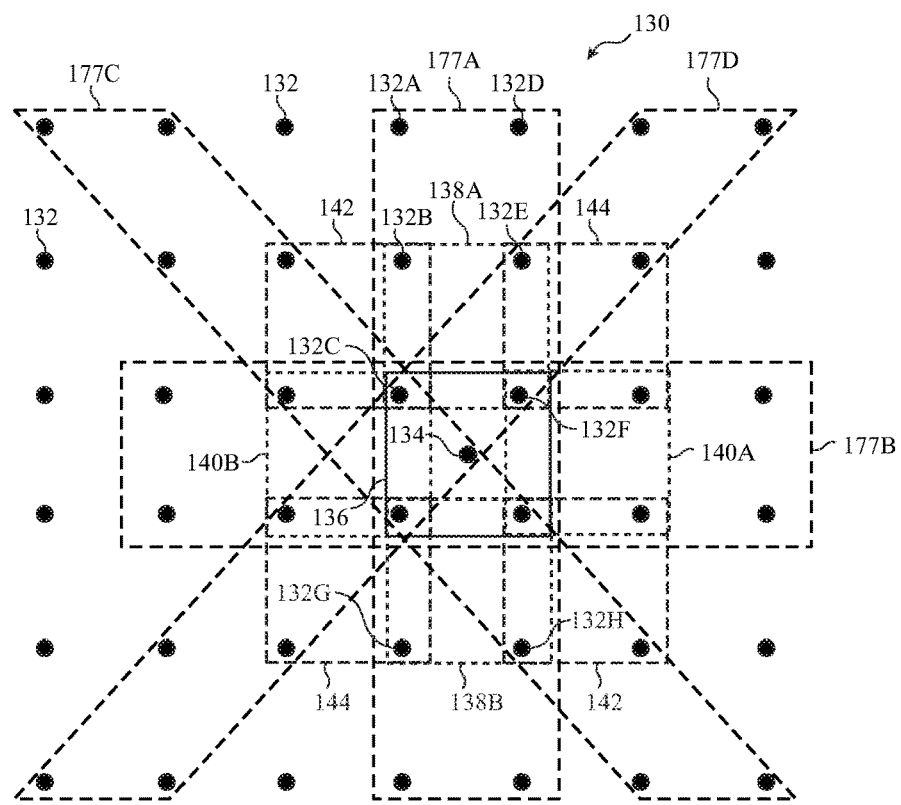
FIG. 12 is representative diagram of image pixels surrounding an offset sub-pixel, in accordance with an embodiment.

To help illustrate, a diagrammatic representation of a group 130 of image pixels 132 surrounding an offset sub-pixel 134 is shown in FIG. 12. In the depicted embodiment, the current block 136 is a 2×2 block of image pixels 132 around the offset sub-pixel 134. Additionally, the offset blocks include two vertical offset blocks 138, two horizontal offset blocks 140, two forty-five degree offset blocks 142, and two one hundred thirty-five degree offset blocks 144. In particular, the vertical offset blocks 138 are each a 2×2 block of image pixels 132 offset from the current block 136 in the vertical direction, the horizontal offset blocks 140 are each a 2×2 block of image pixels 132 offset from the current block 136 in the horizontal direction, the forty-five degree offset blocks 142 are each a 2×2 block of image pixels 132 offset from the current block 136 in the forty-five degree direction, and the one hundred thirty-five degree offset blocks 144 are each a 2×2 block of image pixels 132 offset from the current block 136 in the one hundred thirty-five degree direction.

Based at least in part on the offset image pixel blocks, the sub-pixel layout resampler block 56 may determine the directional difference metrics associated with the current block 136. For example, the sub-pixel layout resampler block 56 may determine a vertical difference metric based at least in part on the sum-of-absolute difference between the current block 136 and the vertical offset blocks 138. Additionally, the sub-pixel layout resampler block 56 may determine a horizontal difference metric based on the sum-of-absolute difference between the current block 136 and the horizontal offset blocks 140. The sub-pixel layout resampler block 56 may determine a forty-five degree difference metric based on the sum-of-absolute difference between the current block 136 and the forty-five degree offset blocks 142. Furthermore, the sub-pixel layout resampler block 56 may determine a one-hundred thirty-five degree difference metric based on the sum-of-absolute difference between the current block 136 and the one hundred thirty-five degree offset blocks 144. In this manner, the sub-pixel layout resample block 56 may determine directional different metrics associated with the current block 136 of image pixels.

Returning to the process 94 of FIG. 9, the controller 42 may also instruct the sub-pixel layout resampler block 56 to determine blocks of image pixels neighboring the current block 136 (process block 108). In some embodiments, the neighbor blocks may include a top neighbor block, a bottom neighbor block, a right neighbor block, and/or a left neighbor block. Additionally, in some embodiments, each neighbor block may be offset from the current block 136 in a corresponding direction. For example, with regard to the group 130 of image pixels 132 depicted in FIG. 12, the top neighbor block may be the first vertical offset block 138A, the bottom neighbor block may be the second vertical offset block 138B, the right neighbor block may be the first horizontal offset block 140A, and the left neighbor block may be the second horizontal offset block 140B.

Returning to the process 94 of FIG. 9, the controller 42 may instruct the sub-pixel layout resampler block 56 to determine directional difference metrics associated with the neighbor blocks (process block 110). One embodiment of a process 156 for determining neighbor block directional difference metrics is shown in FIG. 13. Generally, the process 156 includes determining top neighbor directional difference metrics (process block 158), determining bottom neighbor directional difference metrics (process block 160), determining right neighbor directional difference metrics (process block 162), and determining left neighbor directional difference metrics (process block 164). In some embodiments, the process 156 may be implemented based on circuit connections formed in the display pipeline 36. Additionally or alternatively, in some embodiments, the process 156 may be implemented by executing instructions stored in a tangible, non-transitory, computer-readable medium, such as the controller memory 52, using processing circuitry, such as the controller processor 50.

Accordingly, in some embodiments, the controller 42 may instruct the sub-pixel layout resampler block 56 to determine directional difference metrics associated with the top neighbor block (process block 158), to determine directional difference metrics associated with the bottom neighbor block (process block 160), to determine directional difference metrics associated with the right neighbor block (process block 162), and to determine directional metrics associated with the left neighbor block (process block 164). In some embodiments, the sub-pixel layout resampler block 56 may determine directional difference metrics associated with a neighbor block in a similar manner as the directional difference metrics associated with the current block 136, for example, using the process 146 described in FIG. 11.

Returning to the process 94 of FIG. 9, the controller 42 may instruct the sub-pixel layout resampler block 56 to determine high frequency metrics (e.g., statistics) (process block 111). As described above, the high frequency metrics may indicate whether the offset sub-pixel is expected to be located in a high frequency region of the image. Since target luminance rapidly changes in a high frequency region, in some embodiments, the sub-pixel layout resampler block 56 may determine the high frequency metrics based at least in part on difference between neighboring image pixels in a region surrounding the offset sub-pixel.

To help illustrate, one embodiment of a process 155 for determining high frequency metrics is described in FIG. 14. Generally, the process 155 includes determining horizontal high frequency metrics (process block 157), determining vertical high frequency metrics (process block 159), determining forty-five degree high frequency metrics (process block 161), and determining one hundred thirty-five degree high frequency metrics (process block 163). In some embodiments, the process 155 may be implemented based on circuit connections formed in the display pipeline 36. Additionally or alternatively, in some embodiments, the process 155 may be implemented by executing instructions stored in a tangible non-transitory computer-readable medium, such as the controller memory 52, using processing circuitry, such as the controller processor 50.

Accordingly, in some embodiments, the controller 52 may instruct the sub-pixel layout resampler block 56 to determine the horizontal high frequency metrics, the vertical high frequency metrics, the forty-five degree high frequency metrics, and/or the one hundred thirty-five degree high frequency metrics. Additionally, in some embodiments, the sub-pixel layout resampler block 56 may determine high frequency metrics associated with a first direction based at least in part on difference between neighboring image pixels a second direction orthogonal to the first direction.

To help illustrate, one embodiment of a process 167 for determining high frequency metrics associated with a direction is described in FIG. 15. Generally, the process 167 includes determining an orthogonal region (process block 169), determining neighbor difference values (process block 171), determining high frequency difference values (process block 173), and determining base difference values (process block 175). In some embodiments, the process 167 may be implemented based on circuit connections formed in the display pipeline 36. Additionally or alternatively, in some embodiments, the process 167 may be implemented by executing instructions stored in a tangible non-transitory computer-readable medium, such as the controller memory 52, using processing circuitry, such as the controller processor 50.

Accordingly, in some embodiments, the controller 52 may instruct the sub-pixel layout resampler block 56 to determine an orthogonal region of image pixels surrounding an offset sub-pixel (process block 169). In other words, the orthogonal region used to determine high frequency metrics associated with a first direction may include image pixels offset in a second direction orthogonal to the first direction. For example, with regard to FIG. 12, image pixels in a vertical orthogonal region 177A may be used to determine horizontal high frequency metrics, image pixels in a horizontal region 177B may be used to determine vertical high frequency metrics, image pixels in a one hundred thirty-five degree region 177C may be used to determine forty-five degree high frequency metrics, and image pixels in a forty-five degree region 177D may be used to determined one hundred thirty-five degree high frequency metrics.

Returning to the process 167 of FIG. 15, the controller 52 may instruct the sub-pixel layout resampler block 56 to determine neighbor difference values (process block 171). In some embodiments, the neighbor difference values associated with the first direction may include difference between pairs of image pixels in the orthogonal region, which neighbor one another in the second (e.g., orthogonal) direction. For example, with regard to FIG. 12, neighbor difference values associated with the horizontal direction may include a first neighbor difference value between a first image pixel 132A and a second image pixel 132B in the vertical orthogonal region 177A, a second neighbor difference value between the second image pixel 132B and a third image pixel 132C in the vertical orthogonal region 177A, a third neighbor difference value between a fourth image pixel 132D and a fifth image pixel 132E in the vertical orthogonal region 177A, a fourth neighbor difference value between the fifth image pixel 132E and a sixth image pixel 132F in the vertical orthogonal region 177A, and so on. In a similar manner, neighbor difference values associated with the vertical direction, neighbor difference value associated with the forty-five degree direction, and/or neighbor difference values associated with the one hundred thirty-five degree direction may be determined. As will be described in more detail below, the neighbor difference values may be used to determine likelihood that the offset sub-pixel 134 is located in a high frequency region.

Returning to the process 167 of FIG. 15, the controller 52 may instruct the sub-pixel layout resampler block 56 to determine high frequency difference values (process block 173). In some embodiments, the high frequency difference values associated with the first direction may include difference between pairs of neighbor difference values, which are determined based on image pixels centered around an image pixel. For example, with regard to FIG. 12, high frequency difference values associated with the horizontal direction may include a first high frequency difference value between first neighbor difference value and the second neighbor difference value, a second high frequency difference value between the third neighbor difference value and the fourth neighbor difference value, and so on. In a similar manner, high frequency difference values associated with the vertical direction, high frequency difference value associated with the forty-five degree direction, and/or high frequency difference values associated with the one hundred thirty-five degree direction may be determined.

Returning to the process 167 of FIG. 15, the controller 52 may instruct the sub-pixel layout resampler block 56 to determine base difference values (process block 175). In some embodiments, the base difference values associated with the first direction may include difference between specific pairs of image pixels in the orthogonal region. For example, with regard to FIG. 12, base difference values associated with the horizontal direction may include a first base difference value between the second image pixel 132B and a seventh image pixel 132G. Additionally, base difference values associated with the horizontal direction may include a second base difference value between the fifth image pixel 132E and an eighth image pixel 132H. In a similar manner, base difference values associated with the vertical direction, base difference value associated with the forty-five degree direction, and/or base difference values associated with the one hundred thirty-five degree direction may be determined.

In this manner, the sub-pixel layout resampler block 56 may determine high frequency metrics (e.g., neighbor difference values, high frequency difference values, and/or base difference values) associated with each of the horizontal direction, the vertical direction, the forty-five degree direction, and/or the one hundred thirty-five degree direction. As will be described in more detail below, the neighbor difference values may be used to determine likelihood that the offset sub-pixel 134 is located in a high frequency region. Additionally, the high frequency difference values may be used to adjust an orthogonal difference metric when the offset sub-pixel is expected to be located in a high frequency region. Furthermore, the base difference values may be used to adjust an orthogonal difference metric when the offset sub-pixel is not expected to be located in a high frequency region.

Returning to the process 94 of FIG. 9, the controller 42 may instruct the sub-pixel layout resampler block 56 to determine filter parameters (process block 112). As described above, the sub-pixel layout resampler block 56 may adaptively adjust the filter parameters to facilitate improving perceived image quality when an image is displayed on the electronic display 12. For example, the sub-pixel layout resampler block 56 may determine a filter mode to be applied to a color component corresponding with the current offset sub-pixel.

Figure 16:
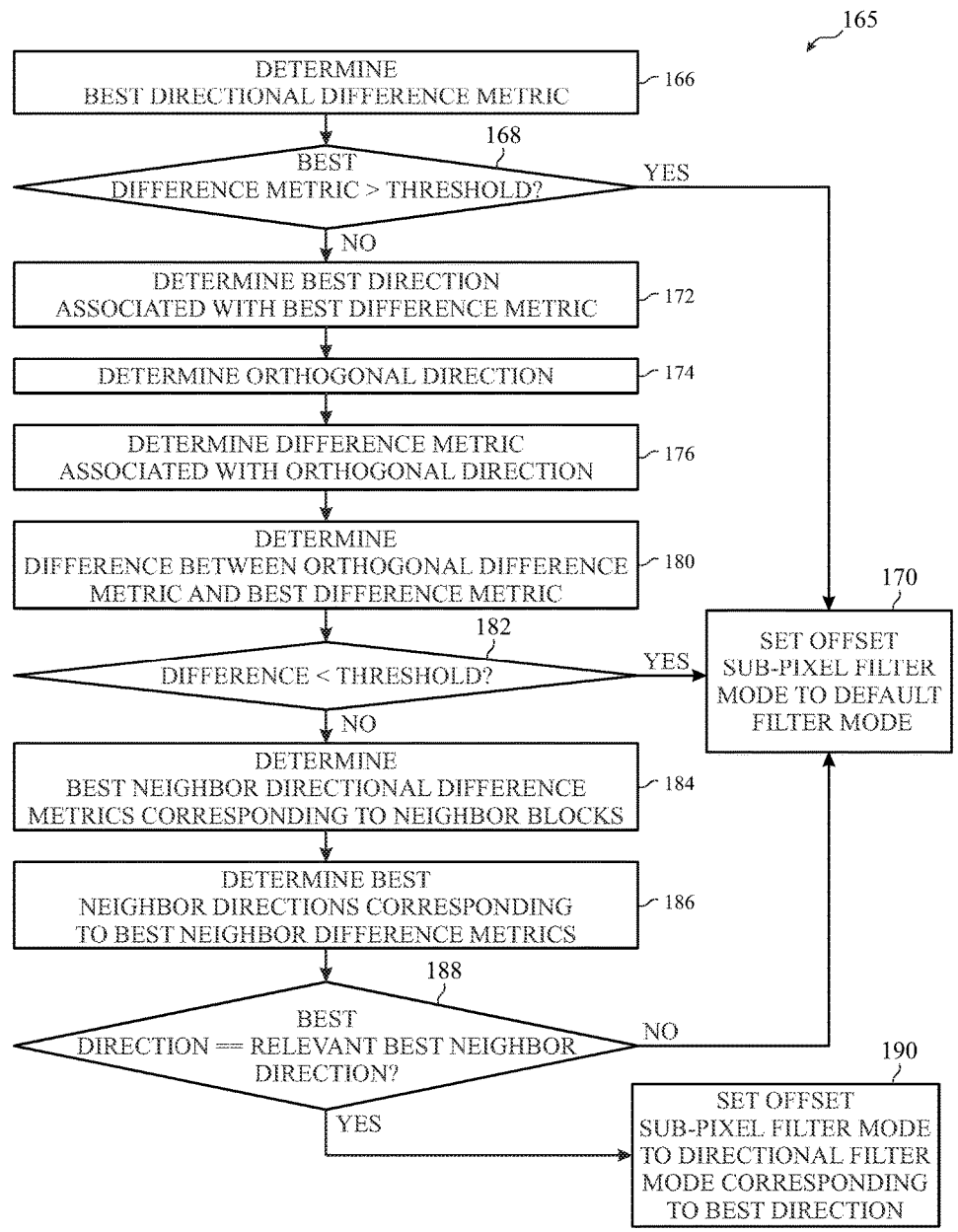
FIG. 16 is a flow diagram of a process for determining an offset sub-pixel filter mode used in the sub-pixel layout resampler block of FIG. 8, in accordance with an embodiment.

To help illustrate, one embodiment of a process 165 for determining a filter mode for an offset sub-pixel is descried in FIG. 16. Generally, the process 165 includes determining a best directional difference metric (process block 166), determining whether the best directional difference metric is greater than a metric threshold (decision block 168), and setting an offset sub-pixel filter mode to a default filter mode when the best difference directional difference metric is greater than the metric threshold (process block 170).

When not greater than the metric threshold, the process 165 includes determining a best direction associated with the best directional difference metric (process block 172), determining an orthogonal direction (process block 174), determining a directional difference metric associated with the orthogonal direction (process block 176), determining difference between the orthogonal difference metric and the best difference metric (process block 180), determining whether the difference between the orthogonal difference metric and the best difference metric is less than a difference threshold (decision block 182), and setting the offset sub-pixel filter mode to the default filter mode when the difference between the orthogonal difference metric and the best difference metric is less that the difference threshold (process block 170).

Additionally, when not less than the difference threshold, the process 165 includes determining best neighbor directional difference metrics corresponding to neighbor blocks (process block 184), determining best neighbor directions corresponding to the best neighbor directional difference metrics (process block 186), determining whether the best direction matches a relevant best neighbor direction (decision block 188), setting the offset sub-pixel filter mode to the default filter mode when the best direction does not match the relevant best neighbor direction (process block 170), and setting the offset sub-pixel filter mode to a directional filter mode associated with the best direction when the best direction matches the relevant best neighbor direction (process block 190). In some embodiments, the process 165 may be implemented based on circuit connections formed in the display pipeline 36. Additionally or alternatively, in some embodiments, the process 165 may be implemented by executing instructions stored in a tangible non-transitory computer-readable medium, such as the controller memory 52, using processing circuitry, such as the controller processor 50.

Accordingly, in some embodiments, the controller 42 may instruct the sub-pixel layout resampler block 56 to determine a best directional difference metric corresponding to the current block (process block 166). In some embodiments, the sub-pixel layout resampler block 56 may determine the best directional difference metric by comparing the horizontal difference metric, the vertical difference metric, the forty-five degree difference metric, and/or the one hundred thirty-five degree difference metric and selecting the lowest value as the best directional difference metric.

Additionally, the controller 42 may instruct the sub-pixel layout resampler block 56 to determine whether the best directional difference metric is greater than a metric threshold (decision block 168). Generally, image pixels along an edge should be relatively similar. As such, value of the best directional difference metric may be indicative of how likely an edge is present at the offset sub-pixel. Thus, in some embodiments, the metric threshold may be set as a divider in a range of edge likelihoods. For example, when greater than the metric threshold, the sub-pixel layout resampler block 56 may determine that an edge is not expected to be present at the offset sub-pixel and, thus, set the offset sub-pixel filter mode to a default filter mode (process block 170). In some embodiments, the default filter mode may be an equally weighted interpolation of surrounding image pixels 132.

On the other hand, when not greater than the metric threshold, the controller 42 may instruct the sub-pixel layout resampler block 56 to determine a direction associated with the best directional difference metric (process block 172). For example, the sub-pixel layout resampler block 56 may determine that the best direction is the horizontal direction when the best directional difference metric is the horizontal difference metric, that the best direction is the vertical direction when the best directional difference metric is the vertical difference metric, and so one.

Additionally, the controller 42 may instruct the sub-pixel layout resampler block 56 to determine a direction orthogonal to the best direction (process block 174). For example, the sub-pixel layout resampler block 56 may determine that the orthogonal direction is the horizontal direction when the best direction is the vertical direction and vice versa. Additionally, the sub-pixel layout resampler block 56 may determine the orthogonal direction is the forty-five degree direction when the best direction is the one hundred thirty-five degree direction and vice versa.

Furthermore, the controller 42 may instruct the sub-pixel layout resampler block 56 to determine a difference metric associated with the orthogonal direction (process block 176). In some embodiments, the orthogonal difference metric may be previously determined, for example, when determining the best directional difference metric. For example, the sub-pixel layout resampler block 56 may determine that the orthogonal difference metric is the horizontal difference metric when the orthogonal direction is the horizontal direction.

As described above, the sub-pixel layout resampler block 56 may take into account certainty (e.g., likelihood) that an edge is actually present at the offset sub-pixel to facilitate improving perceived image quality. Additionally, as described above, the high frequency metrics may be indicative of whether the offset sub-pixel is located in a high frequency region. In other words, the high frequency metrics may indicate likelihood that the edge is detected due to the offset sub-pixel being detected due to being located in a high frequency region and, thus, likelihood that the edge is actually present. Accordingly, in some embodiments, the sub-pixel layout resampler block 56 may adjust the orthogonal difference metric based at least in part on high frequency metrics before subsequent use to facilitate improving perceived image quality.

Figure 17:
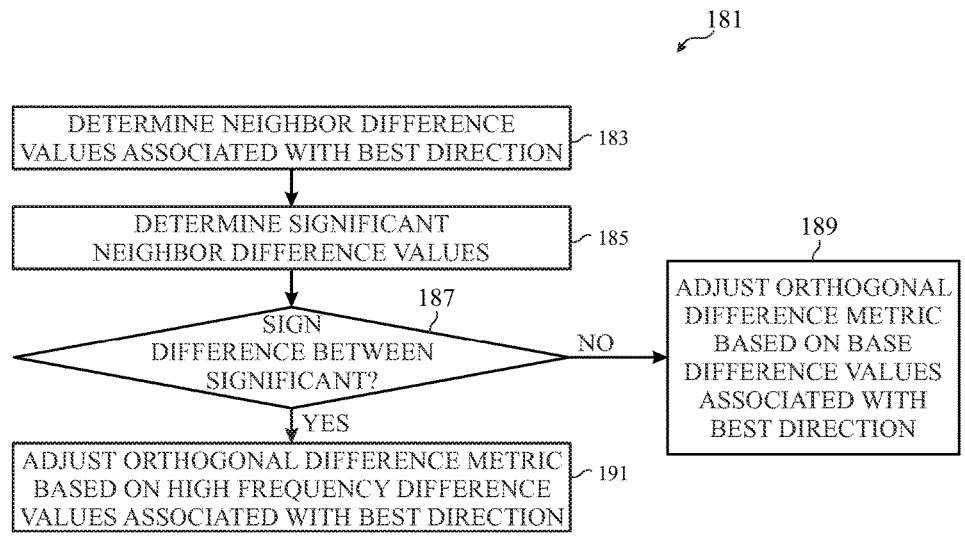
FIG. 17 is a flow diagram of a process for adjusting an orthogonal difference metric used in the sub-pixel layout resampler block of FIG. 8, in accordance with an embodiment.

To help illustrate, one embodiment of a process 181 for adjusting an orthogonal difference metric is described in FIG. 17. Generally, the process includes determining neighbor difference values associated with a best direction (process block 183), determining significant neighbor difference values (process block 185), determining whether there is a sign difference between any of the significant neighbor difference values (decision block 187), adjusting an orthogonal difference metric based on base difference values associated with the best direction when there is not a sign difference (process block 189), and adjusting the orthogonal difference metric based on high frequency difference values with the best direction when there is a sign difference (process block 189). In some embodiments, the process 181 may be implemented based on circuit connections formed in the display pipeline 36. Additionally or alternatively, in some embodiments, the process 181 may be implemented by executing instructions stored in a tangible non-transitory computer-readable medium, such as the controller memory 52, using processing circuitry, such as the controller processor 50.

Accordingly, in some embodiments, the controller 42 may instruct the sub-pixel layout resampler block 56 to determine neighbor difference values associated with the best direction (process block 183). For example, with regard to FIG. 12, the sub-pixel layout resampler block 56 may determine the first neighbor difference value (e.g., difference between the first image pixel 132A and the second image pixel 132B), the second neighbor difference value (e.g., difference between the second image pixel 132B and the third image pixel 132C), the third neighbor difference value (e.g., difference between the fourth image pixel 132D and the fifth image pixel 132E), the fourth neighbor difference value (e.g., difference between the fifth image pixel 132E and the sixth image pixel 132F), and so on when the best direction is the horizontal direction. In a similar manner, the sub-pixel layout resampler block 56 may determine neighbor difference values associated with other best directions (e.g., the vertical direction, the forty-five degree direction, or the one hundred thirty-five degree direction).

Returning to the process 181 of FIG. 17, the controller 42 may instruct the sub-pixel layout resampler block 56 to identify significant neighbor difference values from the neighbor difference values associated with the best direction (process block 185). In some instances, difference between neighboring image pixels may be caused by noise. Accordingly, in some embodiments, the sub-pixel layout resampler block 56 may determine whether a neighbor difference value is significant by comparing absolute value of the neighbor difference value with a noise threshold, which accounts for differences resulting from noise. Additionally, in some embodiments, the sub-pixel layout resampler block 56 may set neighbor difference values not identified as significant to zero.

Furthermore, the controller 42 may instruct the sub-pixel layout resampler block 56 to determine whether there is a sign difference between any of the significant neighbor difference values (decision block 187). For example, the sub-pixel layout resampler block 56 may determine that there is not a sign difference when each of significant neighbor difference value is positive or zero. Additionally, the sub-pixel layout resampler block 56 may determine that there is not a sign difference when each of significant neighbor difference value is negative or zero. On the other hand, the sub-pixel layout resampler block 56 may determine that there is a sign difference when a first significant neighbor difference value is positive and a second significant neighbor difference value is negative. In some embodiments, a sign change may indicate a rapid change between neighboring image pixels and, thus, that the offset sub-pixel is likely located in a high frequency region.

Accordingly, when there is not a sign difference, the controller 42 may determine that the offset sub-pixel is not expected to be located in a high frequency region and, thus, instruct the sub-pixel layout resampler block 56 to adjust the orthogonal difference metric based at least in part on the base difference values associated with best direction (process block 189). In some embodiments, the adjust the orthogonal difference metric based at least in part on the best difference metric and/or an adjustment value. When the offset sub-pixel is not expected to be located in a high frequency region, in some embodiments, the sub-pixel layout resampler block 56 may determine the adjustment value by normalizing a summation of the absolute value of each of the base difference values associated with best direction.

On the other hand, when there is a sign difference may determine that the offset sub-pixel is expected to be located in a high frequency region and, thus, instruct the sub-pixel layout resampler block 56 to adjust the orthogonal difference metric based at least in part on the high frequency difference values associated with best direction (process block 191). As described above, in some embodiments, the adjust the orthogonal difference metric based at least in part on the best difference metric and/or an adjustment value. However, when the offset sub-pixel is expected to be located in a high frequency region, in some embodiments, the sub-pixel layout resampler block 56 may determine the adjustment value by normalizing a summation of the absolute value of each of the high frequency difference values associated with best direction. As will be described in more detail below, the orthogonal difference metric may be used to adaptively adjust the filter parameters, for example, when used an index for a look-up-table. Accordingly, by adjusting the orthogonal difference metric based on the high frequency metrics, the sub-pixel layout resampler block 56 may account for certainty of whether an edge is actually present at the offset sub-pixel when determining the filter parameters to improve perceived image quality.

Returning to the process 165 of FIG. 16, the controller 42 may instruct the sub-pixel layout resampler block 56 to determine difference between the orthogonal difference metric and the best difference metric (process block 180) and whether the difference is less than a difference threshold (decision block 182). Since an edge generally runs in a single direction, difference between image pixels along the edge should be much lower than image pixels in a direction orthogonal to the edge. In other words, the greater the orthogonal difference metric compared to the best difference metric the more likely an edge is present at the offset sub-pixel. On the other hand, the closer the orthogonal difference metric is to the best difference metric the more likely that the offset sub-pixel is in a high frequency area and, thus, not along an edge.

Thus, difference between the orthogonal difference metric and the best difference metric may indicate how likely the offset sub-pixel is in a high frequency area and, thus, not located at an edge. Additionally, the difference threshold may be set as a divider in range of high frequency area likelihood. For example, when the difference is less than the difference threshold, the sub-pixel layout resampler block 56 may determine that the sub-pixel is likely located in a high frequency area and, thus, set the offset sub-pixel filter mode to the default filter mode (process block 170).

On the other hand, when not the difference is not less than the difference threshold, the controller 42 may instruct the sub-pixel layout resampler block 56 to determine a best neighbor directional difference metric corresponding to each neighbor block (process block 184) and to determine a best neighbor direction corresponding to each best neighbor directional difference metric. In some embodiments, the sub-pixel layout resampler block 56 may determine the best directional difference metric of a neighbor block in a similar manner as the best directional difference metric of the current block 136. Additionally, in some embodiments, the sub-pixel layout resampler block 56 may determine the best neighbor direction corresponding to a best neighbor directional difference metric in a similar manner as the best direction corresponding to the current block 136.

Furthermore, the controller 42 may instruct the sub-pixel layout resampler block 56 to determine whether the best direction of the current block 136 matches the best neighbor direction of a relevant neighbor block (decision block 188). For example, when the best direction of the current block 136 is the vertical direction, the sub-pixel layout resampler block 56 may determine whether the best neighbor direction of the top neighbor block and/or the bottom neighbor block is also the vertical direction. Similarly, when the best direction of the current block 136 is the horizontal direction, the sub-pixel layout resampler block 56 may determine whether the best neighbor direction of the right neighbor block and/or the left neighbor block is also the horizontal direction.

Additionally, when the best direction of the current block 136 is the forty-five degree direction, the sub-pixel layout resampler block 56 may determine whether the best neighbor direction of the top neighbor, the right neighbor, the bottom neighbor, and/or the left neighbor is also the forty-five degree direction. Similarly, when the best direction of the current block 136 is the one hundred thirty-five degree direction, the sub-pixel layout resampler block 56 may determine whether the best neighbor direction of the top neighbor, the right neighbor, the bottom neighbor, and/or the left neighbor is also the one hundred thirty-five degree direction. When the best direction does not match one or more of the relevant best neighbor directions, the sub-pixel layout resampler block 56 may set the offset sub-pixel filter mode to the default mode (process block 170).

On the other hand, when the best direction matches at least one relevant best neighbor direction, the sub-pixel layout resampler block 56 may set the offset sub-pixel filter mode to a directional filter mode corresponding the best direction (process block 190). For example, the sub-pixel layout resampler block 56 may set the offset sub-pixel filter mode to a vertical filter mode when the best direction of the current block 136 is the vertical direction and so on.

In some embodiments, the sub-pixel layout resampler block 56 may determine other filter parameters based at least in part on the offset filter mode. For example, the sub-pixel layout resampler block 56 may determine offset filter phases, such as a vertical filter phase and/or a horizontal filter phase. Additionally, the sub-pixel layout resampler block 56 may determine offset sub-pixel filter coefficients based at least in part on the offset filter phases.

Figure 18:
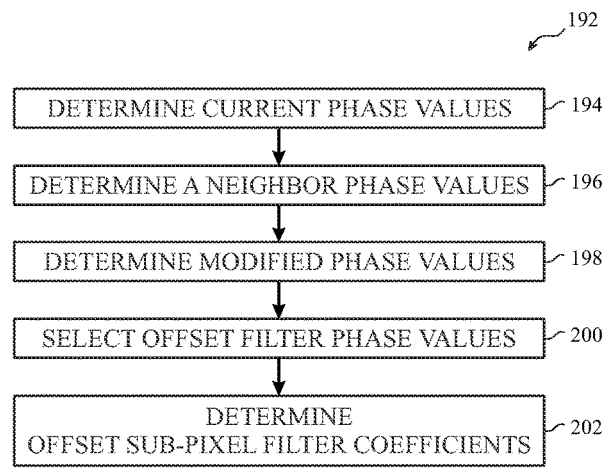
FIG. 18 is a flow diagram of a process for determining offset sub-pixel filter coefficients used in the sub-pixel layout resampler block of FIG. 8, in accordance with an embodiment.

To help illustrate, one embodiment of a process 192 for determining filter phase values and offset sub-pixel filter coefficients is shown in FIG. 18. Generally, the process 192 includes determining current phase values (process block 194), determining neighbor phase values (process block 196), determining modified phase values (process block 198), selecting offset filter phase values (process block 200), and determining offset sub-pixel filter coefficients (process block 202). In some embodiments, the process 192 may be implemented based on circuit connections formed in the display pipeline 36. Additionally or alternatively, in some embodiments, the process 192 may be implemented by executing instructions stored in a tangible non-transitory computer-readable medium, such as the controller memory 52, using processing circuitry, such as the controller processor 50.

Accordingly, in some embodiments, the controller 42 may instruct the sub-pixel layout resampler block 56 to determine phase values associated with the current block 136 (process block 194). In some embodiments, the sub-pixel layout resampler block 56 may determine a current phase value based at least in part on the best difference metric and the orthogonal difference metric. For example, the best difference metric and the orthogonal difference metric may be used as indices to a 2D look-up-table (LUT) of phase values. In fact, in some embodiments, a first index may be N (e.g., five) number of most-significant-bits (MSBs) from the best difference metric and a second index may be N number of MSBs from the orthogonal difference metric. Additionally, since the orthogonal difference metric should be greater than the best difference metric, approximately half of the entries in a 2D look-up-table may be unused. Thus, in some embodiments, this may enable instead using a 1D look-up-table of phase values.

In some embodiments, a current phase value may indicate variation of the filtering applied compared to the default filter mode. Additionally, in some embodiments, the sub-pixel layout resampler block 56 may implement the filtering using a separate vertical filter and a separate horizontal filter. Thus, in such embodiments, the sub-pixel layout resampler block may determine a current vertical filter phase corresponding with the vertical filter and a current horizontal filter phase corresponding with the horizontal filter.

To facilitate determining the current vertical filter phase and/or the current horizontal filter phase, the sub-pixel layout resampler block 56 may adjust the current phase value based at least in part on the offset sub-pixel filter mode. For example, the sub-pixel layout resampler block 56 may apply (e.g., add, subtract, multiply, and/or divide) different offsets to the current phase value based at least in part on the offset sub-pixel filter mode and/or location of the offset sub-pixel relative to the co-located sub-pixel. Additionally, in some embodiments, the offsets applied to determine the current horizontal filter phase and the current vertical filter phase may be different.

The controller 42 may also instruct the sub-pixel layout resampler block 56 to determine phase values associated with each neighbor block of image pixels (process block 196). In some embodiments, the sub-pixel layout resampler block 56 may determine the neighbor phase values associated with a neighbor block in a similar manner as the current phase values associated with the current block 136. For example, the sub-pixel layout resampler block 56 may determine a top neighbor phase value corresponding with the top neighbor block based at least in part on the best top neighbor difference metric and a top neighbor orthogonal difference metric, and so on. Additionally, the sub-pixel layout resampler block 56 may determine a top neighbor vertical phase value and/or a top neighbor horizontal phase value based at least in part on the top phase value, and so on.

In some embodiments, the sub-pixel layout resampler block 56 adjust a neighbor orthogonal difference metric based at least in part on neighbor high frequency metrics associated with a best neighbor direction. For example, the sub-pixel layout resampler block 56 may adjust the neighbor orthogonal difference metric based at least in part on the best neighbor difference metric and/or a neighbor adjustment value. In some embodiments, the sub-pixel layout resampler block 56 may determine the neighbor adjustment value by normalizing a summation of the absolute value of each of the neighbor high frequency difference values associated with the best neighbor direction. In this manner, the sub-pixel layout resampler block 56 may further account for certainty of whether an edge is actually present at the offset sub-pixel to improve perceived image quality.

Based at least in part on the current phase values and the neighbor phase values, the controller 42 may instruct the sub-pixel layout resampler block 56 to determine modified phase values (process block 198). In some embodiments, the sub-pixel layout resampler block 56 may determine the modified phase values by filtering the current phase values based on the neighbor phase values. For example, the sub-pixel layout resampler block 56 may determine a modified vertical filter phase by filtering the current vertical filter phase corresponding to the current block 136 with a neighbor vertical filter phase corresponding to each neighbor block. Additionally, the sub-pixel layout resampler block 56 may determine a modified horizontal filter phase by filtering the current horizontal filter phase corresponding to the current block 136 with a neighbor horizontal filter phase corresponding to each neighbor block.

Additionally, the controller 42 may instruct the sub-pixel layout resampler block 56 to determine offset filter phase values (process block 200). In some embodiments, the sub-pixel layout resampler block 56 may set the offset filter phase values based at least in part on the current phase values and/or the modified phase values. For example, the sub-pixel layout resampler block 56 may set the offset filter phase values as the current phase values or as the modified phase values based at least in part on gain value to be applied to the offset sub-pixel and/or gain value to be applied to the co-located sub-pixel.

Figure 19:
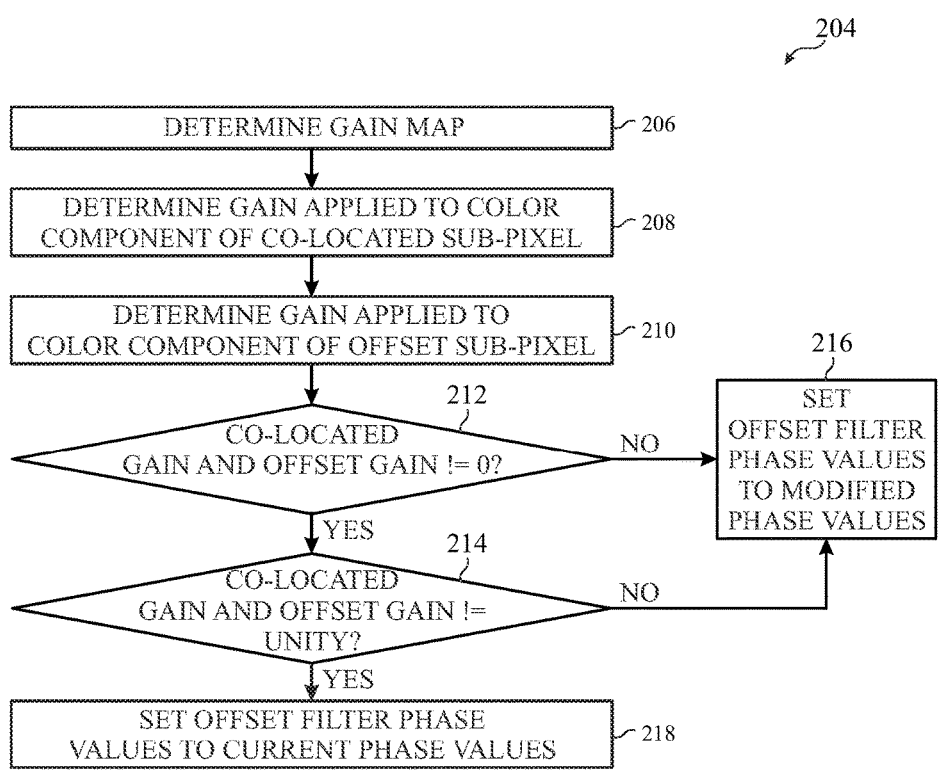
FIG. 19 is a flow diagram of a process for determining filter phase values used in the sub-pixel layout resampler block of FIG. 8, in accordance with an embodiment.

To help illustrate, one embodiment of a process 204 for determining the offset filter phase values is shown in FIG. 19. Generally, the process 204 includes determining a gain map (process block 206), determining gain applied to color component of a co-located sub-pixel (process block 208), determining gain value applied to color component of an offset sub-pixel (process block 210), determining whether the co-located gain and the offset gain both are not zero (decision block 212), and determining whether the co-located gain and the offset gain are both not unity (decision block 216). When the co-located gain is not zero or unity and the offset gain is not zero or unity, the process 204 includes setting an offset filter phase values to the current phase values. Otherwise, the process 204 includes setting the offset filter phase values to the modified phase values (process block 218). In some embodiments, the process 192 may be implemented based on circuit connections formed in the display pipeline 36. Additionally or alternatively, in some embodiments, the process 192 may be implemented by executing instructions stored in a tangible non-transitory computer-readable medium, such as the controller memory 52, using processing circuitry, such as the controller processor 50.

Accordingly, in some embodiments, the controller 42 may instruct the sub-pixel layout resampler block 56 to determine a gain map 74 (process block 206). As described above, the gain map 74 may be stored in the gain block 58, for example, in a compressed format. Thus, in some embodiments, the sub-pixel layout resampler block 56 may receive the gain map 74 from the gain block 58 and decompress the gain map 74. As described above, in some embodiments, the gain map 74 may indicate gain to be applied at locations in an image, for example, at portions of the image along borders of the electronic display 12.

Thus, based at least in part on the gain map 74, the controller 42 may instruct the sub-pixel layout resampler block 56 to determine a gain value to be applied to the co-located sub-pixel in the current display pixel (process block 208) and a gain value to be applied to the offset sub-pixel in the current display pixel (process block 210). In some embodiments, the gain values may range from zero to unity.

Based at least in part on the gain values, the controller 42 may instruct the sub-pixel layout resampler block 56 to set the offset filter phase values as the modified phase values (process block 216) or to set the offset filter phase values as the current phase values (process block 218). For example, the sub-pixel layout resampler block 56 may set an offset vertical filter phase to the current vertical filter phase and an offset horizontal filter phase to the current horizontal filter phase when the co-located gain and offset gain both do not equal zero or unity. On the other hand, the sub-pixel layout resampler block 56 may set the offset vertical filter phase to the modified vertical filter phase and the offset horizontal filter phase to the modified horizontal filter phase when at least one of the co-located gain and the offset gain is equal to zero or unity. In this manner, the sub-pixel layout resampler block 56 may determine the offset filter phase values.

Returning to the process 192 of FIG. 18, the controller 42 may instruct the sub-pixel layout resampler block 56 to determine offset sub-pixel filter coefficients based at least in part on the offset filter phase values (process block 202). In some embodiments, the offset sub-pixel filter coefficients may used to implement the offset filter phase values. Thus, in some embodiments, the offset sub-pixel filter coefficients may include horizontal offset sub-pixel coefficients used by the horizontal filter and/or vertical offset sub-pixel coefficients used by the vertical filter. In this manner, the sub-pixel layout resampler block 56 may determine filter parameters (e.g., offset filter phase values and/or offset sub-pixel filter coefficients) to be applied to the image pixel image data 70.

Returning to the process 94 of FIG. 9, the controller 42 may instruct the sub-pixel layout resampler block 56 to determine the display pixel image data 72 corresponding with the current display pixel based at least in part on the filter parameters (process block 114). As described above, the display pixel image data 72 may include offset sub-pixel image data corresponding with the offset sub-pixel and co-located sub-pixel image data corresponding with the co-located sub-pixel. In some embodiments, to determine the offset sub-pixel image data and/or the co-located sub-pixel image data, the sub-pixel layout resampler block 56 may filter image pixel image data 70 corresponding with a group of image pixels around the current image pixel.

Figure 20:
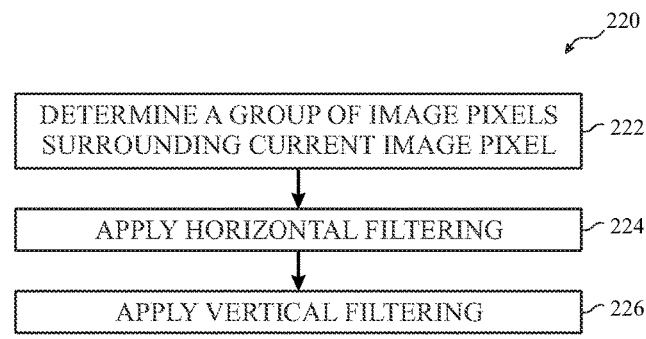
FIG. 20 is a flow diagram of a process for filtering the input pixel group using the sub-pixel layout resampler block of FIG. 8 to determine offset sub-pixel image data, in accordance with an embodiment.

To help illustrate, one embodiment of a process 220 for filtering image pixel image data 70 is described in FIG. 20. Generally, the process 220 includes determining a group of image pixels surrounding a current image pixel (process block 222), applying horizontal filtering (process block 224), and applying vertical filtering (process block 226). In some embodiments, the process 220 may be implemented based on circuit connections formed in the display pipeline 36. Additionally or alternatively, in some embodiments, the process 220 may be implemented by executing instructions stored in a tangible non-transitory computer-readable medium, such as the controller memory 52, using processing circuitry, such as the controller processor 50.

Accordingly, in some embodiments, the controller 42 may instruct the sub-pixel layout resampler block 56 to determine a group of image pixels and corresponding image pixel image data 70 (process block 222). For example, to determine the co-located sub-pixel image data, the sub-pixel layout resampler block 56 may select an N×N (e.g., 3×3 or 5×5) group of image pixels including the current image pixel surrounding the co-located sub-pixel. Additionally, to determine the offset sub-pixel image data, the sub-pixel layout resampler block 56 may select an M×M (e.g., 6×6) group of image pixels surrounding the offset sub-pixel, such as the image pixel group 130 shown in FIG. 12.

Based on the image pixel group, the controller 42 may instruct the sub-pixel layout resampler block 56 to apply horizontal filtering (process block 224) and to apply vertical filtering (process block 226). In some embodiments, the sub-pixel layout resampler block 56 may successively (e.g., separately) apply the horizontal filtering and the vertical filtering. For example, to determine the offset sub-pixel image data, the sub-pixel layout resampler block 56 may apply an M×1 (e.g., 6×1) horizontal filter on each row of the image pixel group and a 1×M (e.g., 1×6) vertical filter on each column of the output from the horizontal filter based at least in part on the offset filter parameters (e.g., offset filter coefficients).

In a similar manner, when the co-located filter parameters indicate using separable filters, the sub-pixel layout resampler block 56 may apply an N×1 (e.g., 5×1) horizontal filter on each row of the image pixel group and a 1×N (e.g., 1×5) vertical filter on each column of the output from the horizontal filter based at least in part on the co-located filter parameters (e.g., co-located filter coefficients). On the other hand, when the co-located filter parameters indicate using a non-separable filter, the sub-pixel layout resampler block 56 may apply a N×N (e.g., 3×3) filter on the image pixel group based at least in part on the co-located filter parameters (e.g., co-located filter coefficients). In this manner, the sub-pixel layout resampler block 56 may determine the offset sub-pixel image data and the co-located image data corresponding with the current display pixel and, thus, the display pixel image data 72 in a display format.

Returning to the process 94 of FIG. 9, the controller 42 may instruct the sub-pixel layout resampler block 56 to apply gain to the display pixel image data 72 (process block 116). As described above, the gain values may be determined based on the gain map 74 stored in the gain block 58. Based at least in part on the gain values, the sub-pixel layout resampler block 56 may apply an offset gain to the offset sub-pixel image data and/or a co-located gain to the co-located sub-pixel image data. In some embodiments, applying gain values to the display pixel image data 72 may reduce likelihood of perceivable visual artifacts—particularly at display pixels along borders of the electronic display 12.

Additionally, when output image data is expected to be in the gamma domain, the controller 42 may instruct the sub-pixel layout resampler block 56 to convert the display pixel image data 72 from the linear domain to the gamma domain (process block 118). Furthermore, when output image data is expected to be in a source format (e.g., RGB format), the controller 42 may instruct the sub-pixel layout resampler block 56 to upscale the display pixel image data 72 to convert from a display format (e.g., GR or GB format) to the source format (process block 120). In some embodiments, the sub-pixel layout resampler block 56 may convert to the source format by adding image data corresponding with a missing color component to the display pixel image data 72.

Figure 21:
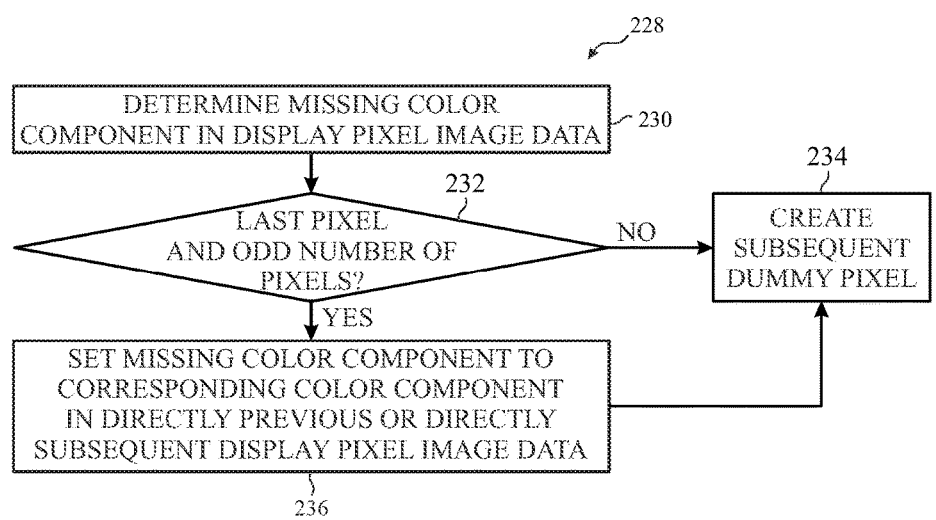
FIG. 21 is a flow diagram of a process for upscaling image data in a display pixel format to an input pixel format, in accordance with an embodiment.

To help illustrate, one embodiment of a process 228 for converting display pixel image data 72 from a display format to a source format is shown in FIG. 21. Generally, the process 228 includes determining a missing color component in display pixel image data (process block 230), determining whether a display pixel corresponding with the display pixel image data is a last pixel and an image includes an odd number of image pixels (decision block 232), and creating a subsequent dummy pixel when the display pixel is the last pixel and the image includes an odd number of pixels (process block 234). Additionally, the process 228 includes setting the missing component to a corresponding color component in a directly previous or directly subsequent display pixel image data (process block 236). In some embodiments, the process 228 may be implemented based on circuit connections formed in the display pipeline 36. Additionally or alternatively, in some embodiments, the process 228 may be implemented by executing instructions stored in a tangible non-transitory computer-readable medium, such as the controller memory 52, using processing circuitry, such as the controller processor 50.

Accordingly, the controller 42 may instruct the sub-pixel layout resampler block 56 to determine a missing component from the display pixel image data 72 corresponding with the current display pixel (process block 230). For example, when the display pixel image data 72 is in a GR format, the sub-pixel layout resampler block 56 may determine that the blue component is missing. On the other hand, when the display pixel image data 72 is in a GB format, the sub-pixel layout resampler block 56 may determine that the red component is missing.

To convert to the source format (e.g., RGB format), the controller 42 may instruct the sub-pixel layout resampler block 56 to copy image data of the missing color component from a directly previous or directly subsequent display pixel image data (process block 236). For example, when the blue color component is missing from current display pixel image data, the sub-pixel layout resampler block may copy blue component image data from directly previous display pixel image data into the current display pixel image data and copy red component image data from the current display pixel image data to the directly previous display pixel image data.

Thus, when the current display pixel is the last display pixel and the image includes an odd number of image pixels, subsequent display pixel image data may be unavailable for swapping color component image data with the current display pixel image data. Thus, the controller 42 may instruct the sub-pixel layout resampler block 56 to create a subsequent dummy pixel (process block 234). In some embodiments, the dummy pixel may include image data with each color component set to zero. In other embodiments, the dummy pixel may be a copy of other display pixel image data and/or include image data with color components set to any suitable value. In this manner, the sub-pixel layout resampler block 56 may determine display pixel image data 72, which when used to display an image provides improved perceived image quality.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
an electronic display comprising a display pixel configured to facilitate displaying an image, wherein the display pixel comprises a co-located sub-pixel configured to control luminance of a first color component and an offset sub-pixel configured to control luminance of a second color component;
a display pipeline communicatively coupled to the electronic display, wherein the display pipeline comprises a sub-pixel layout resampler block configured to:
  determine first image data that indicates target luminance of the first color component, the second color component, and a third color component at a first image pixel in the image;
  determine edge parameters based at least in part on a first difference metric between a first image pixel block centered around the offset sub-pixel and a second image pixel block offset from the first image pixel block, wherein the edge parameters indicate at least whether an edge is expected to be present at the offset sub-pixel when displaying the image;
  determine offset filter parameters based at least in part on the edge parameters; and
  determine offset sub-pixel image data by filtering a first image pixel group centered around the offset sub-pixel based at least in part on the offset filter parameters, wherein the offset sub-pixel image data indicates target luminance of the offset sub-pixel to display the image.

2. The electronic device of claim 1, comprising an image data source communicatively coupled to the display pipeline, wherein:
  the image data source is configured to generate the first image data in a red-green-blue (RGB) format, wherein the first color component comprises a green color component, the second color component comprises a red color component, and the third color component comprises a blue color component; and
  the sub-pixel layout resampler block is configured to determine second image data in a green-red (GR) format, wherein the second image data comprises the offset sub-pixel image data and co-located sub-pixel image data that indicates target luminance of the co-located sub-pixel to display the image.

3. The electronic device of claim 2, wherein the sub-pixel layout resampler block is configured to:
  determine third image data that indicates target luminance of at least the first color component and the third color component at a second image pixel determined directly before or directly after the first image data; and
  determine the second image data in the red-green-blue format by including blue color component image data of the third image data in the second image data.

4. The electronic device of claim 1, wherein the sub-pixel layout resampler block is configured to:
  determine co-located filter parameters based at least in part on expected difference between a first pixel response of the co-located sub-pixel and a second pixel response of the offset sub-pixel;
  determine co-located sub-pixel image data by filtering a second image pixel group centered around the co-located sub-pixel based at least in part on the co-located filter parameters, wherein the co-located sub-pixel image data indicates target luminance of the co-located sub-pixel to display the image; and
  determine second image data based at least in part on the offset sub-pixel image data and the co-located sub-pixel image data, wherein the second image data indicates target luminance of only the first color component and the second color component at the display pixel to display the image.

5. The electronic device of claim 1, wherein, to determine the edge parameters, the sub-pixel layout resampler block is configured to:
  determine the first difference metric by determining a first sum-of-absolute difference between the first image pixel block and the second image pixel block, wherein the second image pixel block comprises a first offset image pixel block vertically offset from the first image pixel block;
  determine a second difference metric by determining a second sum-of-absolute difference between the first image pixel block and a second offset image pixel block, wherein the second offset image pixel block is horizontally offset from the first image pixel block;
  determine a third difference metric by determining a third sum-of-absolute difference between the first image pixel block and a third offset image pixel block, wherein the third offset image pixel block is forty-five degrees offset from the first image pixel block;
  determine a fourth difference metric by determining a fourth sum-of-absolute difference between the first image pixel block and a fourth offset image pixel block, wherein the fourth offset image pixel block is one hundred thirty-five degrees offset from the first image pixel block; and
  determine expected direction of the edge at the offset sub-pixel based at least in part on the first difference metric, the second difference metric, the third difference metric, and the fourth difference metric.

6. The electronic device of claim 5, wherein, to determine the edge parameters, the sub-pixel layout resampler block is configured to:
  determine a fifth difference metric by determining a fifth sum-of-absolute difference between the first image pixel block and a fifth offset image pixel block, wherein the fifth offset image pixel block is vertically offset from the first image pixel block opposite the first offset image pixel block;
  determine a sixth difference metric by determining a sixth sum-of-absolute difference between the first image pixel block and a sixth offset image pixel block, wherein the sixth offset image pixel block is horizontally offset from the first image pixel block opposite the second offset image pixel block;
  determine a seventh difference metric by determining a seventh sum-of-absolute difference between the first image pixel block and a seventh offset image pixel block, wherein the seventh offset image pixel block is forty-five degrees offset from the first image pixel block opposite the third offset image pixel block;
  determine an eighth difference metric by determining an eighth sum-of-absolute difference between the first image pixel block and an eighth offset image pixel block, wherein the eighth offset image pixel block is one-hundred thirty-five degrees offset from the first image pixel block opposite the fourth offset image pixel block; and
  determine a best difference metric, wherein the best difference metric comprises smallest of the first difference metric, the second difference metric, the third difference metric, the fourth difference metric, the fifth difference metric, the sixth difference metric, the seventh difference metric, and the eighth difference metric; and determine the expected direction of the edge at the offset sub-pixel by selecting a best direction corresponding with the best difference metric.

7. The electronic device of claim 6, wherein, to determine the edge parameters, the sub-pixel layout resampler block is configured to:
determine an orthogonal direction, wherein the orthogonal direction is orthogonal to the best direction;
determine an orthogonal difference metric associated with the orthogonal direction;
adjust the orthogonal difference metric based at least in part on high frequency metrics associated with the best direction, wherein the high frequency metrics are indicative of whether the offset sub-pixel is expected to be located in a high frequency region of the image;
determine a difference between the best difference metric and the orthogonal difference metric; and
determine that the edge is not expected to be present at the offset sub-pixel when the difference is less than a difference threshold.

8. The electronic device of claim 7, wherein, to determine the edge parameters, the sub-pixel layout resampler block is configured to, when the best difference metric is not greater than a metric threshold and the difference between the best difference metric and the orthogonal difference metric is not less than the difference threshold:
determine a best neighbor difference metric corresponding to a neighbor image pixel block offset from the first image pixel block in the best direction;
determine a best neighbor direction corresponding to the best neighbor difference metric; and
determine that the edge is expected to be present at the offset sub-pixel when the best direction matches the best neighbor direction.

9. The electronic device of claim 1, wherein, to determine the offset filter parameters, the sub-pixel layout resample block is configured to:
set an offset sub-pixel filter mode to a default filter mode when the edge parameters indicate that the edge is not expected to be present at the offset sub-pixel;
set the offset sub-pixel filter mode to a directional filter mode when the edge parameters indicate that the edge is expected to be present at the offset sub-pixel, wherein the directional filter mode corresponds to an expected direction of the edge indicated by the edge parameters; and
when the offset sub-pixel filter mode is set to the directional filter mode:
determine offset filter phase values that indicate variation of the directional filter mode from the default filter mode; and
determine offset sub-pixel filter coefficients that indicate filtering strength to be used to implement the offset filter phase values.

10. The electronic device of claim 9, wherein, to determine the offset filter phase value, the sub-pixel layout resample block is configured to:
determine an expected direction of the edge at the offset sub-pixel indicated by the edge parameters;
determine a best difference metric based at least in part on a first sum-of-absolute difference between the first image pixel block and a first offset image pixel block offset from the first image pixel block in the expected direction;
determine an orthogonal direction that is orthogonal to the expected direction;
determine an orthogonal difference metric based at least in part on a second sum-of-absolute difference between the first image pixel block and a second offset image pixel block offset from the first image pixel block in the orthogonal direction;
adjust the orthogonal difference metric based at least in part on high frequency metrics associated with the best direction; and
determine current phase values using a look-up-table indexed by a first N most-significant bits of the best difference metric and a second N most-significant bits of the orthogonal difference metric.

11. The electronic device of claim 1, wherein:
the electronic display comprises an organic light-emitting diode display;
the first image pixel block comprises a first 2×2 block of image pixels;
the second image pixel block comprises a second 2×2 block of image pixels;
the first image pixel group comprises a 6×6 block of image pixels;
the offset sub-pixel is one of a top-left, a top-right, a bottom-left, and a bottom-right relative to the co-located sub-pixel;
the co-located sub-pixel is co-located with the first image pixel; and
the offset sub-pixel is offset from the first image pixel.

12. The electronic device of claim 1, wherein the electronic device comprises a portable phone, a media player, a personal data organizer, a handheld game platform, a tablet device, a computer, or any combination thereof.

13. A method for facilitating display of an image on an electronic display, comprising:
receiving, using a display pipeline, first image data in a first format generated by an image data source communicatively coupled to the electronic display, wherein the first image data indicates target luminance of a first plurality of color components at a first image pixel in the image;
determining, using the display pipeline, a sub-pixel layout of the electronic display, wherein the sub-pixel layout indicates that a first sub-pixel is co-located with the first image pixel, a second sub-pixel is offset from the first image pixel, the first sub-pixel controls luminance of a first color component at a first display pixel, and the second sub-pixel controls luminance of a second color component at the first display pixel;
determining, using the display pipeline, whether an edge is expected to be present at the second sub-pixel in the image based at least in part on a first sum-of-absolute difference between a current image pixel block surrounding the second sub-pixel and a first offset image pixel block offset from the current image pixel block in a first direction;
adjusting, using the display pipeline, offset filter parameters from a default filter mode to a directional filter mode when the edge is expected to be present at the second sub-pixel based at least in part on the sub-pixel layout and expected direction of the edge at the second sub-pixel; and
filtering, using the display pipeline, a first image pixel group surrounding the second sub-pixel based at least in part on the offset filter parameters to facilitate determining second image data in a second format that indicates target luminance of a second plurality of color components at the first display pixel to display the image.

14. The method of claim 13, comprising determining, using the display pipeline, the expected direction of the edge at the second sub-pixel by:
   determining the first sum-of-absolute difference, wherein the first offset image pixel block is offset from the current image pixel block in a vertical direction;
   determining a second sum-of-absolute difference between the current image pixel block and a second offset image pixel block offset from the current image pixel block in a horizontal direction;
   determining a third sum-of-absolute difference between the current image pixel block and a third offset image pixel block offset from the current image pixel block in a forty-five degree direction; and
   determining a fourth sum-of-absolute difference between the current image pixel block and a fourth offset image pixel block offset from the current image pixel block in a one-hundred thirty-five degree direction; and
   setting the expected direction to one of the vertical direction, the horizontal direction, the forty-five degree direction, and the one-hundred thirty-five degree direction based at least in part on the first sum-of-absolute difference, the second sum-of-absolute difference, the third sum-of-absolute difference, and the fourth sum-of-absolute difference.

15. The method of claim 14, wherein determining whether the edge is expected to be present at the second sub-pixel in the image comprises:
   selecting one of the first sum-of-absolute difference, the second sum-of-absolute difference, the third sum-of-absolute difference, and the fourth sum-of-absolute difference that corresponds to the expected direction as a best difference metric;
   determining an orthogonal direction that is orthogonal to the expected direction, wherein an orthogonal difference metric comprises sum-of-absolute difference between the current image pixel block and an offset image pixel block that is offset from the current image pixel block in the expected direction of the edge;
   adjusting the orthogonal difference metric based at least in part on high frequency metrics associated with the expected direction, wherein the high frequency metrics are indicative of whether the second sub-pixel is expected to be located in a high frequency region of the image; and
   determining a difference between the best difference metric and the orthogonal difference metric;
   determining a best neighbor difference metric comprising sum-of-absolute difference between the offset image pixel block and a fifth offset image pixel block offset from the offset image pixel block in a best neighbor direction; and
   determining that the edge is expected to be present when the best difference metric is not greater than a metric threshold, the difference between the best difference metric and the orthogonal difference metric not less than a difference threshold, and the expected direction matches the best neighbor direction.

16. The method of claim 13, wherein:
   adjusting the offset filter parameters comprises, when the edge is expected to be present at the second sub-pixel:
   switching from the default filter mode to the directional filter mode based at least in part on the expected direction of the edge at the second sub-pixel; and
   determine offset filter phase values that indicate variation of the directional filter mode from the default filter mode based at least in part on a first gain to be applied to the first color component at the first sub-pixel and a second gain to be the second color component at the second sub-pixel; and
   filtering the first image pixel group comprises determining a portion of the second image data that indicates target luminance of the second color component at the second sub-pixel by:
   when the edge is not expected to be present at the second sub-pixel, equally interpolating second color component image data of the first image pixel group, wherein the first image pixel group comprises N×N image pixels centered around the second sub-pixel; and
   when the edge is expected to be present at the second sub-pixel:
      sequentially vertical filtering each column of the first image pixel group based at least in part on the offset filter phase values; and
      sequentially horizontal filtering each row of the first image pixel group based at least in part on the offset filter phase values.

17. A tangible, non-transitory, computer-readable medium storing instructions executable by one or more processors of an electronic device, wherein the instructions comprise instructions to:
   determine, using the one or more processors, a source format of first image data output by an image source to indicate target luminance at a first image pixel in an image to be displayed on an electronic display;
   determine, using the one or more processors, a configuration of sub-pixels in a first display pixel of the electronic display, wherein the first display pixel corresponds with the first image pixel and the configuration indicates at least relative location and color component of each of the sub-pixels;
   determine, using the one or more processors, a display format of second image data to be generated by processing the first image data based at least in part on the configuration of the sub-pixels; and
   when the display format does not match the source format:
      instruct, using the one or more processors, the electronic device to determine whether an edge is expected to be present at the first display pixel to display the image;
      instruct, using the one or more processors, the electronic device to determine expected direction of the edge at the first display pixel to display the image; and
      instruct, using the one or more processors, the electronic device to determine the second image data by adaptively filtering image data corresponding with a group of image pixels surrounding the first image pixel based at least in part on whether the edge is expected to be present, the expected direction of the edge, or both to facilitate improving perceived image quality of the image when displayed on the electronic display based at least in part on the second image data.

18. The computer-readable medium of claim 17, comprising instructions to determine, using the one or more processors, that the display format does not match the source format when:
 the source format comprises a red-green-blue (RGB) format that indicates target luminance of a red component, a green component, and a blue component at the first image pixel; and
 the display format comprises a green-red (GR) format that indicates target luminance of only the green component and the red component at the first display pixel to display the image or a green-blue (GB) format that indicates target luminance of only the green component and the blue component at the first display pixel to display the image;
 wherein the instructions to determine the display format comprise instructions to:
  determine that the display format is the green-red (GR) format when the configuration indicates that the first display pixel comprises only a green sub-pixel and a red sub-pixel; and
  determine that the display format is the green-blue (GB) format when the configuration indicates that the first display pixel comprises only the green sub-pixel and a blue sub-pixel.

19. The computer-readable medium of claim 17, wherein:
 the instructions to instruct the electronic device to determine the expected direction of the edge at the first display pixel comprise instructions to instruct the electronic device to:
  determine a plurality of difference metrics between a current image pixel block centered around an offset sub-pixel of the first display pixel and a plurality of offset image pixel blocks offset from the current image pixel block, wherein each of the plurality of difference metrics corresponds to one of the plurality of offset image pixel blocks; and
  set the expected direction of the edge to a direction corresponding with a smallest of the plurality of difference metrics; and
 the instructions to instruct the electronic device to determine whether the edge is expected to be present at the first display pixel comprise instructions to instruct the electronic device to:
  determine a plurality of high frequency metrics that indicate whether the offset sub-pixel is expected to be located in a high frequency area of the image;
  determine a first neighbor difference metric based at least in part on variation between a second offset image pixel block offset from the current image pixel block in the expected direction and a third offset image pixel block offset from the second offset image pixel block in a first direction;
  determine a second neighbor difference metric based at least in part on variation between a fourth offset image pixel block offset from the current image pixel block in the expected direction opposite the second offset image pixel block and a fifth offset image pixel block offset from the fourth offset image pixel block in a second direction; and
  determine that the edge is expected to be present at the offset sub-pixel of the first display pixel when the best difference metric indicates that the current image pixel block is sufficiently similar to the second offset image pixel block, the high frequency metrics indicate that the offset sub-pixel is not expected to be located in the high frequency area of the image, and the expected direction matches at least one of the first direction and the second direction.

20. The computer-readable medium of claim 17, wherein the instructions to instruct the electronic device to determine the second image data comprise instructions to instruct the electronic device to:
 filter the image data corresponding with the group of image pixels using a default filter mode when the edge is not expected to be present at an offset sub-pixel of the first display pixel, wherein the default filter mode comprise an equal interpolation of the image data; and
 filter the image data corresponding with the group of image pixels using a directional filter mode based at least in part on offset filter phase values that indicate variation of the directional filter mode from the default filter mode when the edge is expected to be present at the offset sub-pixel.

* * * * *